US008018419B2

(12) United States Patent
Morita et al.

(10) Patent No.: US 8,018,419 B2
(45) **Date of Patent: *Sep. 13, 2011**

(54) DATA DRIVER AND ELECTRO-OPTICAL DEVICE

(75) Inventors: Akira Morita, Suwa (JP); Yuichi Toriumi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1072 days.

This patent is subject to a terminal disclaimer.

(21) Appl. No.: 11/882,857

(22) Filed: Aug. 6, 2007

(65) Prior Publication Data

US 2007/0296670 A1 Dec. 27, 2007

Related U.S. Application Data

(63) Continuation of application No. 10/833,996, filed on Apr. 29, 2004, now Pat. No. 7,262,757.

(30) Foreign Application Priority Data

May 12, 2003 (JP) ................................ 2003-133142

(51) Int. Cl.
*G09G 3/36* (2006.01)
*G09G 5/00* (2006.01)
*H04N 3/14* (2006.01)

(52) U.S. Cl. ................ 345/99; 345/89; 345/92; 345/98; 345/100; 345/204; 345/690; 348/793

(58) Field of Classification Search .................... 345/89, 345/92, 98, 99, 100, 103, 204, 690; 348/793
See application file for complete search history.

(56) References Cited

U.S. PATENT DOCUMENTS

| | | | | |
|---|---|---|---|---|
| 5,365,284 | A | 11/1994 | Matsumoto et al. | |
| 5,822,026 | A | 10/1998 | Matsuo | |
| 6,088,014 | A | 7/2000 | Furuhashi et al. | |
| 6,236,386 | B1 | 5/2001 | Watanabe | |
| 6,246,388 | B1 | 6/2001 | Motegi et al. | |
| 7,173,596 | B2 | 2/2007 | Toriumi et al. | |
| 7,206,004 | B2 | 4/2007 | Toriumi et al. | |
| 7,262,757 | B2 * | 8/2007 | Morita et al. | 345/99 |
| 7,375,716 | B2 * | 5/2008 | Toriumi et al. | 345/99 |
| 2004/0212631 | A1 | 10/2004 | Toriumi et al. | |
| 2004/0227744 | A1 | 11/2004 | Toriumi et al. | |
| 2004/0233184 | A1 | 11/2004 | Toriumi et al. | |
| 2004/0239603 | A1 | 12/2004 | Toriumi et al. | |

(Continued)

FOREIGN PATENT DOCUMENTS

JP A 63-182695 7/1988

(Continued)

*Primary Examiner* — My-Chau T Tran
(74) *Attorney, Agent, or Firm* — Oliff & Berridge, PLC

(57) ABSTRACT

A data driver includes a capture start timing setting register in which is set data for setting capture start timing of the gray-scale data based on a signal which indicates supply start timing of the gray-scale data, and a capture instruction signal generation circuit which generates first and second capture instruction signals which are delayed in relation to the signal which indicates the supply start timing of the gray-scale data for a period corresponding to the data set in the capture start timing setting register. First and second data latches capture gray-scale data on a gray-scale bus at timing based on the first and second capture instruction signals, respectively. First and second driver circuits drive comb-tooth distributed data lines belonging to first and second groups based on the gray-scale data captured in the first and second data latches, respectively.

17 Claims, 22 Drawing Sheets

U.S. PATENT DOCUMENTS

2005/0001858 A1 1/2005 Morita et al.

FOREIGN PATENT DOCUMENTS

JP A 03-285479 12/1991
JP A 09-166968 6/1997
JP A 2001-051656 2/2001
JP A 2002-156654 5/2002

* cited by examiner

DATA DRIVER AND ELECTRO-OPTICAL DEVICE

Japanese Patent Application No. 2003-133142, filed on May 12, 2003, is hereby incorporated by reference in its entirety.

This is a Continuation of application Ser. No. 10/833,996, filed Apr. 29, 2004, now issued as U.S. Pat. No. 7,262,757 B2. The disclosure of the prior application is hereby incorporated by reference herein in its entirety.

BACKGROUND OF THE INVENTION

The present invention relates to a data driver and an electro-optical device.

A display panel (electro-optical device or display device in a broad sense) represented by a liquid crystal display (LCD) panel is mounted on portable telephones or personal digital assistants (PDAs). In particular, the LCD panel realizes a reduction of size, power consumption, and cost in comparison with other display panels, and is mounted on various electronic instruments.

An LCD panel is required to have a size equal to or greater than a certain size taking visibility of an image to be displayed into consideration. On the other hand, there has been a demand that the mounting area of the LCD panel be as small as possible when the LCD panel is mounted on an electronic instrument. As an LCD panel which can reduce the mounting area, a so-called comb-tooth distributed LCD panel has been known.

BRIEF SUMMARY OF THE INVENTION

One aspect of the present invention relates to a data driver which drives a plurality of data lines of an electro-optical device which includes a plurality of scan lines, the data lines and a plurality of pixels, the data lines being comb-tooth distributed in units of a predetermined number of the data lines, the data driver including:

a gray-scale bus to which gray-scale data is supplied corresponding to an arrangement order of each of the data lines;

a capture start timing setting register in which is set data for setting capture start timing of the gray-scale data based on a signal which indicates supply start timing of the gray-scale data;

a capture instruction signal generation circuit which generates first and second capture instruction signals which are delayed in relation to the signal which indicates the supply start timing of the gray-scale data for a period corresponding to the data set in the capture start timing setting register;

a first data latch which captures the gray-scale data on the gray-scale bus at capture timing based on the first capture instruction signal;

a second data latch which captures the gray-scale data on the gray-scale bus at capture timing based on the second capture instruction signal;

a first driver circuit which drives a data line belonging to a first group among the plurality of data lines based on the gray-scale data captured in the first data latch; and a second driver circuit which drives a data line belonging to a second group among the plurality of data lines based on the gray-scale data captured in the second data latch.

Another aspect of the present invention relates to an electro-optical device including:

a plurality of scan lines;

a plurality of data lines which are comb-tooth distributed in units of a predetermined number of the data lines;

a plurality of pixels;

the above-described data driver which drives the data lines; and a scan driver which scans the scan lines.

A further aspect of the present invention relates to an electro-optical device including:

a display panel which includes a plurality of scan lines, a plurality of data lines which are comb-tooth distributed in units of a predetermined number of the data lines; and a plurality of pixels;

the above-described data driver which drives the data lines; and a scan driver which scans the scan lines.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirements for the present invention.

In order to reduce the mounting area of the LCD panel, it is effective to reduce the interconnect region between the LCD panel and a scan driver which drives scan lines of the LCD panel, or to reduce the interconnect region between the LCD panel and a data driver which drives data lines of the LCD panel.

However, in the case where a data driver drives data lines of a comb-tooth distributed LCD panel from opposite sides of the LCD panel, it is necessary to change the order of gray-scale data which is supplied corresponding to the arrangement order of the data lines in a conventional LCD panel.

Since a conventional data driver cannot change the order of gray-scale data supplied corresponding to the data lines, a dedicated data scramble IC must be added when driving the comb-tooth distributed LCD panel using a conventional data driver.

Moreover, the period between the change in the signal which indicates the supply start timing of the gray-scale data to the data driver and the timing at which the gray-scale data is actually supplied to the data driver depends on the type of controller and is not constant. Therefore, in the case of driving the comb-tooth distributed LCD panel, the capture order of the gray-scale data becomes incorrect.

According to the following embodiments, a data driver which drives the comb-tooth distributed data lines independent of the supply timing of the gray-scale data, and an electro-optical device including the data driver can be provided.

The embodiments of the present invention are described below in detail with reference to the drawings.

1. Electro-Optical Device

Figure 1:
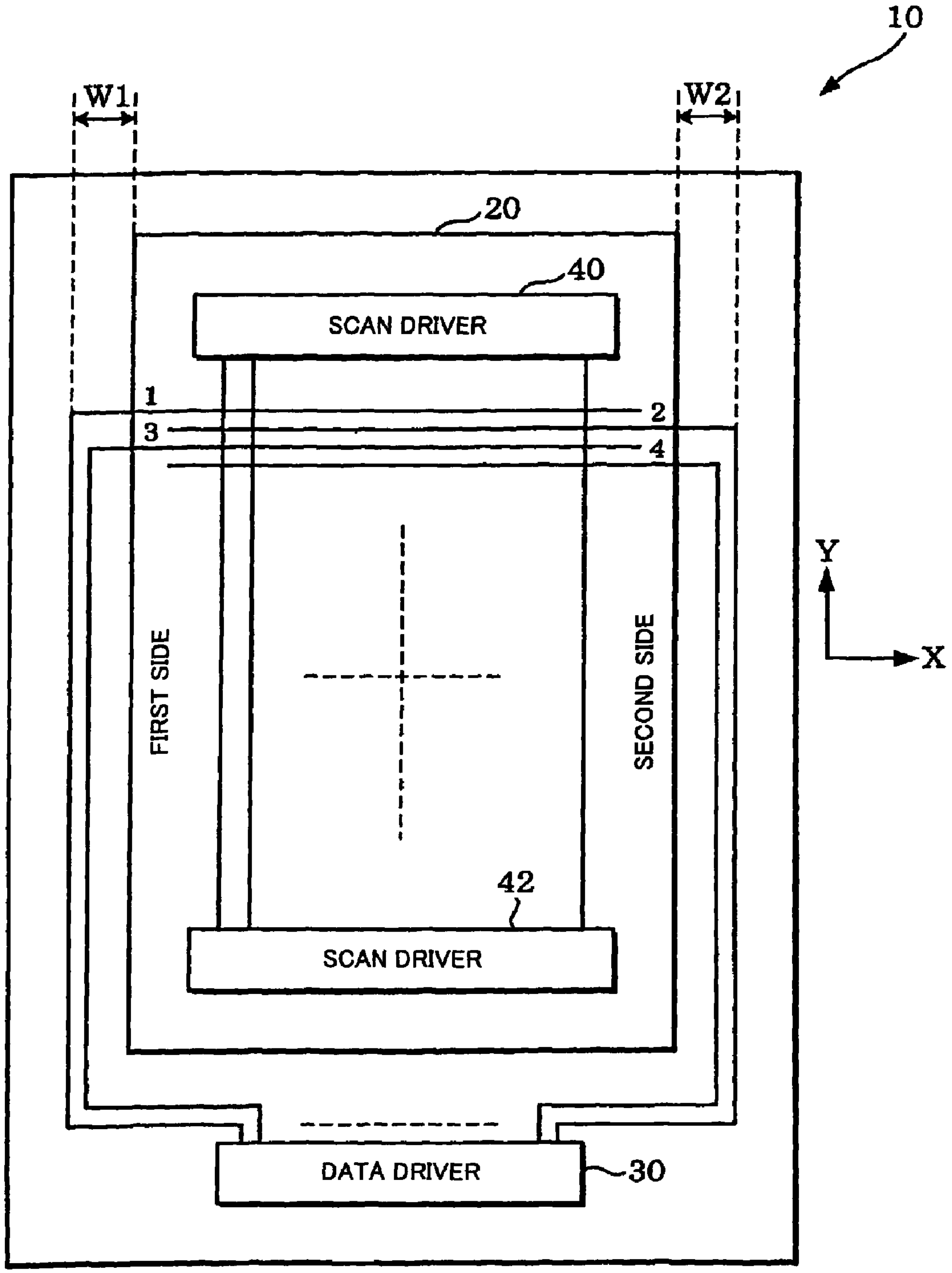
FIG. 1 is a block diagram schematically showing a configuration of an electro-optical device.

FIG. 1 shows an outline of a configuration of an electro-optical device in this embodiment. FIG. 1 shows a liquid crystal device as an example of an electro-optical device. A liquid crystal device may be incorporated in various electronic instruments such as a portable telephone, portable information instrument (PDA or the like), digital camera, projector, portable audio player, mass storage device, video camera, electronic notebook, or global positioning system (GPS).

A liquid crystal device 10 includes an LCD panel 20 (display panel in a broad sense; electro-optical device in a broader sense), a data driver 30 (source driver), and scan drivers 40 and 42 (gate drivers).

The liquid crystal device 10 does not necessarily include all of these circuit blocks. The liquid crystal device 10 may have a configuration in which at least one of the circuit blocks is omitted.

The LCD panel 20 includes a plurality of scan lines (gate lines), a plurality of data lines (source lines) which intersect the scan lines, and a plurality of pixels, each of the pixels being specified by one of the scan lines and one of the data lines. In the case where one pixel consists of three color components of RGB, one pixel consists of three dots, one dot each for red, green, and blue. The dot may be referred to as an element point which makes up each pixel. The data lines for one pixel may be referred to as the data lines in the number of color components which make up one pixel. The following description is mainly given on the assumption that one pixel consists of one dot for convenience of description.

Each pixel includes a thin film transistor (hereinafter abbreviated as "TFT") (switching device), and a pixel electrode. The TFT is connected with the data line, and the pixel electrode is connected with the TFT.

The LCD panel 20 is formed on a panel substrate such as a glass substrate. A plurality of scan lines, arranged in the X direction shown in FIG. 1 and extending in the Y direction, and a plurality of data lines, arranged in the Y direction and extending in the X direction, are disposed on the panel substrate. In the LCD panel 20, the data lines are comb-tooth distributed. In FIG. 1, the data lines are comb-tooth distributed so that the data lines are driven from a first side of the LCD panel 20 and a second side opposite to the first side. The comb-tooth distribution may be referred to as a distribution in which the data lines are alternately distributed inward from opposite sides (first and second sides of the LCD panel 20) in the shape of comb teeth in units of a predetermined number of data lines (one or a plurality of data lines).

Figure 2:
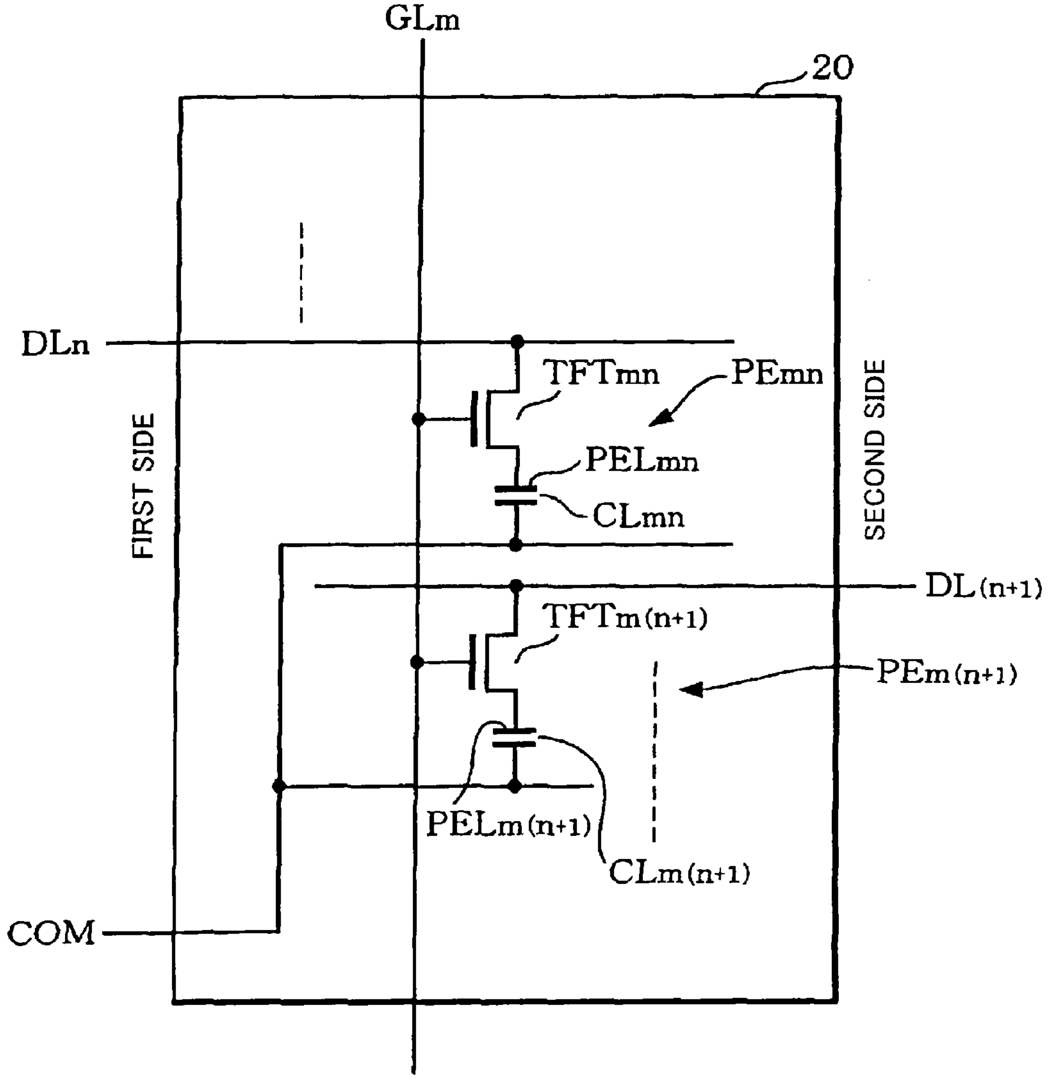
FIG. 2 is a schematic diagram of a configuration of a pixel.

FIG. 2 schematically shows a configuration of the pixel. In FIG. 2, one pixel consists of one dot. A pixel PEmn is provided at a position corresponding to the intersecting point of the scan line GLm ($1 \leqq m \leqq M$, M and m are integers) and the data line DLn ($1 \leqq n \leqq N$, N and n are integers). The pixel PEmn includes the thin film transistor TFTmn and the pixel electrode PELmn.

A gate electrode of the thin film transistor TFTmn is connected with the scan line GLm. A source electrode of the thin film transistor TFTmn is connected with the data line DLn. A drain electrode of the thin film transistor TFTmn is connected with the pixel electrode PELmn. A liquid crystal capacitor CLmn is formed between the pixel electrode and a common electrode COM which faces the pixel electrode through a liquid crystal element (electro-optical material in a broad sense). A storage capacitor may be formed in parallel with the liquid crystal capacitor CLmn. Transmissivity of the pixel changes corresponding to the voltage applied between the pixel electrode and the common electrode COM. A voltage VCOM supplied to the common electrode COM is generated by a power supply circuit (not shown).

The LCD panel 20 is formed by attaching a first substrate on which the pixel electrode and the TFT are formed to a second substrate on which the common electrode is formed, and sealing a liquid crystal as an electro-optical material between the two substrates.

The scan line is scanned by the scan drivers 40 and 42. In FIG. 1, one scan line is driven by the scan drivers 40 and 42 at the same time.

The data line is driven by the data driver 30. The data lines of the LCD panel 20 include the data lines belonging to first and second groups (or, the data lines of the LCD panel 20 belong to either the first or second group).

The data lines belonging to the first group are driven by the data driver 30 from the first side of the LCD panel 20. In more detail, the data lines belonging to the first group are connected with data output sections of the data driver 30 on the first side of the LCD panel 20. In FIG. 1, the data lines DL1, DL3, DL5, . . . , and DL(2$p$−1) (p is a natural number) belong to the first group.

The data lines belonging to the second group are driven by the data driver 30 from the second side of the LCD panel 20 opposite to the first side. In more detail, the data lines belonging to the second group are connected with the data output sections of the data driver 30 on the second side of the LCD panel 20. In FIG. 1, the data lines DL2, DL4, DL6, . . . , and DL2*p* belong to the second group. The first and second sides of the LCD panel 20 face each other in the direction in which the data lines extend.

As described above, in the LCD panel 20, the data lines are comb-tooth distributed so that the data lines in the number of color components of each pixel disposed corresponding to the adjacent pixels connected with the selected scan line are driven from opposite directions.

In more detail, in the LCD panel 20 in which the data lines are comb-tooth distributed as shown in FIG. 2, in the case where the data lines DLn and DL(n+1) are disposed corresponding to the adjacent pixels connected with the selected scan line GLm, the data line DLn is driven by the data driver 30 from the first side of the LCD panel 20, and the data line DL(n+1) is driven by the data driver 30 from the second side of the LCD panel 20.

The above description also applies to the case where the data lines corresponding to RGB color components are disposed corresponding to one pixel. In this case, if the data line DLn consisting of a set of three color component data lines (Rn, Gn, Bn) and the data line DL(n+1) consisting of a set of three color component data lines (R(n+1), G(n+1), B(n+1)) are disposed corresponding to the adjacent pixels connected with the selected scan line GLm, the data line DLn is driven by the data driver 30 from the first side of the LCD panel 20, and the data line DL(n+1) is driven by the data driver 30 from the second side of the LCD panel 20.

The data driver 30 drives the data lines DL1 to DLN of the LCD panel 20 based on the gray-scale data for one horizontal scanning period supplied in units of horizontal scanning periods. In more detail, the data driver 30 drives at least one of the data lines DL1 to DLN based on the gray-scale data.

The scan drivers 40 and 42 scan the scan lines GL1 to GLM of the LCD panel 20. In more detail, the scan drivers 40 and 42 sequentially select the scan lines GL1 to GLM within one vertical scanning period, and drive the selected scan line.

The data driver 30 and the scan drivers 40 and 42 are controlled by a controller (not shown). The controller outputs control signals to the data driver 30, the scan drivers 40 and 42, and the power supply circuit according to the contents set by a host such as a central processing unit (CPU). In more detail, the controller supplies an operation mode setting and a horizontal synchronization signal or a vertical synchronization signal generated therein to the data driver 30 and the scan drivers 40 and 42, for example. The horizontal synchronization signal specifies the horizontal scanning period. The vertical synchronization signal specifies the vertical scanning period.

The controller supplies the gray-scale data generated by the host to the data driver 30. In this case, the controller outputs an enable input/output signal EIO which indicates supply start timing of the gray-scale data to the data driver 30, and sequentially outputs the gray-scale data after a predetermined period has elapsed from the supply start timing. The gray-scale data output from the controller corresponds to each data line, and is supplied to the data driver 30 in the arrangement order of the data lines of the LCD panel 20.

The controller controls the power supply circuit relating to polarity reversal timing of the voltage VCOM applied to the common electrode COM. The power supply circuit generates various voltages for the LCD panel 20 and the voltage VCOM applied to the common electrode COM based on a reference voltage supplied from the outside.

In FIG. 1, the liquid crystal device 10 may include the controller, or the controller may be provided outside the liquid crystal device 10. The host (not shown) may be included in the liquid crystal device 10 together with the controller.

At least one of the scan drivers 40 and 42, the controller, and the power supply circuit may be included in the data driver 30.

At least a part or the entirety of the data driver 30, the scan drivers 40 and 42, the controller, and the power supply circuit may be formed on the LCD panel 20. For example, the data driver 30 and the scan drivers 40 and 42 may be formed on the LCD panel 20. In this case, the LCD panel 20 may be called an electro-optical device. The LCD panel 20 may include a plurality of data lines, a plurality of scan lines, a plurality of pixels, each of the pixels being specified by one of the data lines and one of the scan lines, a data driver which drives the data lines, and a scan driver which scans the scan lines. The pixels are formed in a pixel formation region of the LCD panel 20.

The advantages of the comb-tooth distributed LCD panel are described below.

Figure 3:
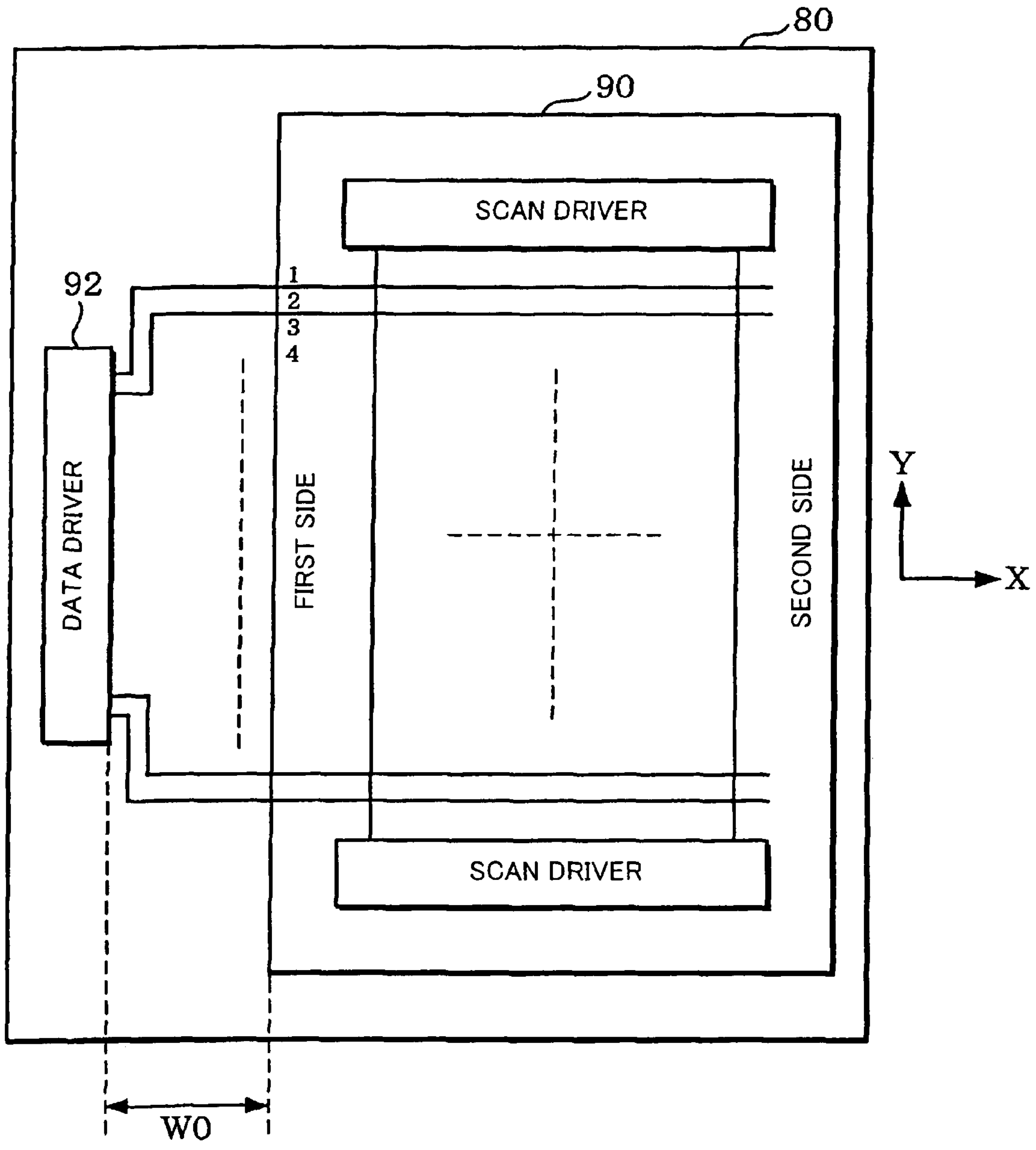
FIG. 3 is a block diagram schematically showing a configuration of an electro-optical device including an LCD panel which is not comb-tooth distributed.

FIG. 3 schematically shows a configuration of an electro-optical device including an LCD panel which is not comb-tooth distributed. An electro-optical device 80 shown in FIG. 3 includes an LCD panel 90 which is not comb-tooth distributed. In the LCD panel 90, the data lines are driven by a data driver 92 from the first side. Therefore, an interconnect region is necessary for connecting the data output sections of the data driver 92 with the data lines of the LCD panel 90. If the lengths of the first and second sides of the LCD panel 90 are increased due to an increase in the number of data lines, it is necessary to bend each interconnect, whereby a width W0 is necessary for the interconnect region.

On the contrary, in the electro-optical device 10 shown in FIG. 1, only widths W1 and W2 which are smaller than the width W0 are respectively necessary on the first and second sides of the LCD panel 20.

Taking mounting on electronic instruments into consideration, it is disadvantageous that the length of the LCD panel (electro-optical device) be increased in the direction of the short side in comparison with the case where the length of the LCD panel is increased in the direction of the long side to some extent. This is undesirable from the viewpoint of the design due to an increase in the width of the frame of the display section of the electronic instrument, for example.

In FIG. 3, the length of the LCD panel is increased in the direction of the short side. On the contrary, the length of the LCD panel is increased in the direction of the long side in FIG. 1. Therefore, the widths of the interconnect regions on the first and second sides can be made narrow to almost an equal extent. In FIG. 1, since the non-interconnect region in FIG. 3 can be reduced, a reduction of the mounting area can be achieved.

Figure 4:
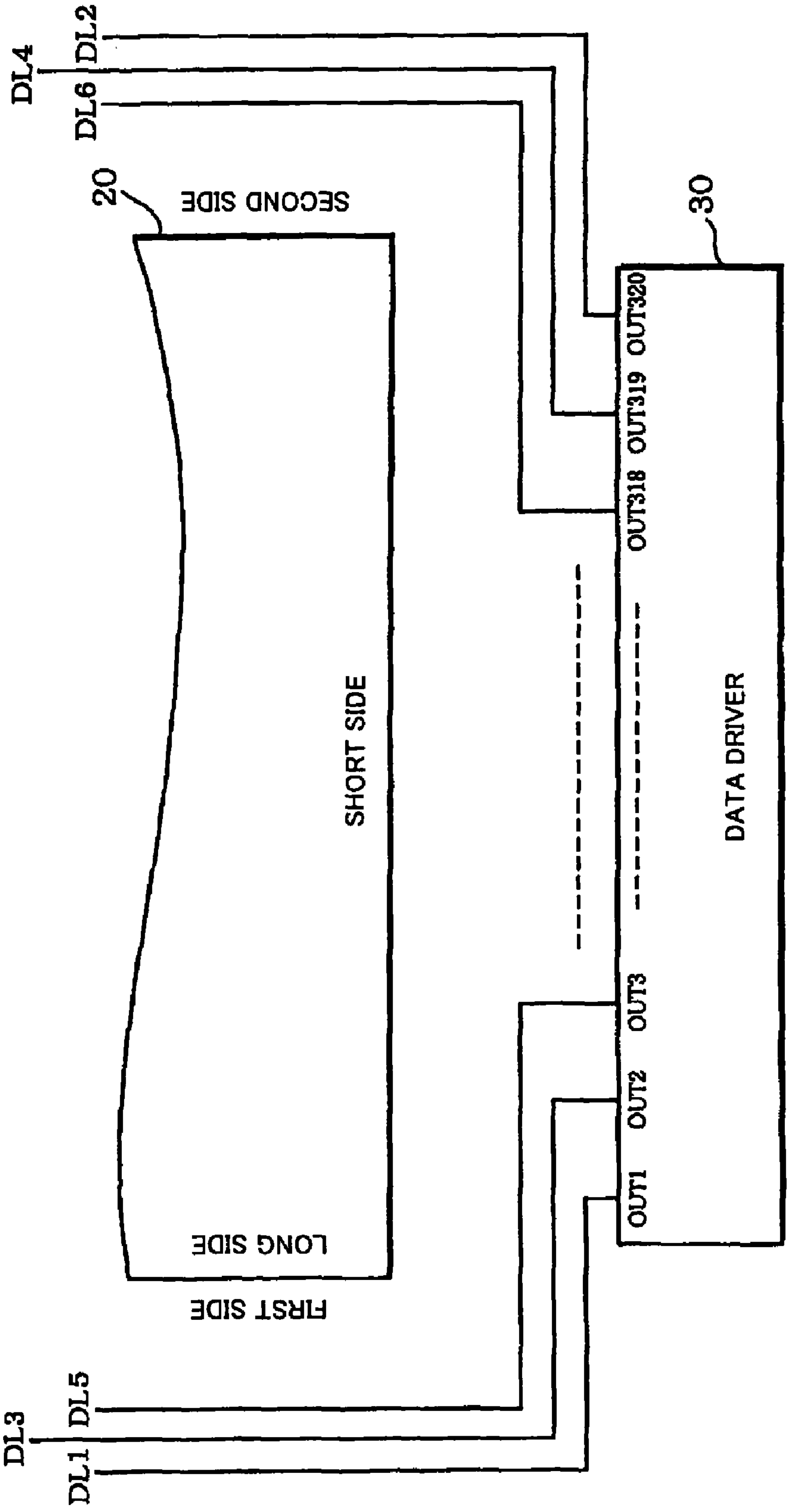
FIG. 4 is illustrative of an example of a data driver disposed along the short side of an LCD panel.

In the case where the arrangement order of the data output sections of the data driver 30 corresponds to the arrangement order of the data lines of the LCD panel 20 (specifically, the arrangement order of the data output sections of the data driver 30 is the same as the arrangement order of the data lines of the LCD panel 20), interconnects for connecting the data output sections with the data lines can be disposed from the first and second sides by disposing the display driver 30 along the short side of the LCD panel 20 as shown in FIG. 4, whereby the interconnects can be simplified and the interconnect region can be reduced.

However, in the data driver 30 which receives the gray-scale data output from a general-purpose controller corresponding to the arrangement order of the data lines, it is necessary to change the order of the received gray-scale data when driving the LCD panel 20.

The following description is given on the assumption that the data driver 30 includes data output sections OUT1 to OUT320, and the data output sections are arranged in the direction from the first side to the second side. The data output sections correspond to the data lines of the LCD panel 20.

Figure 5:
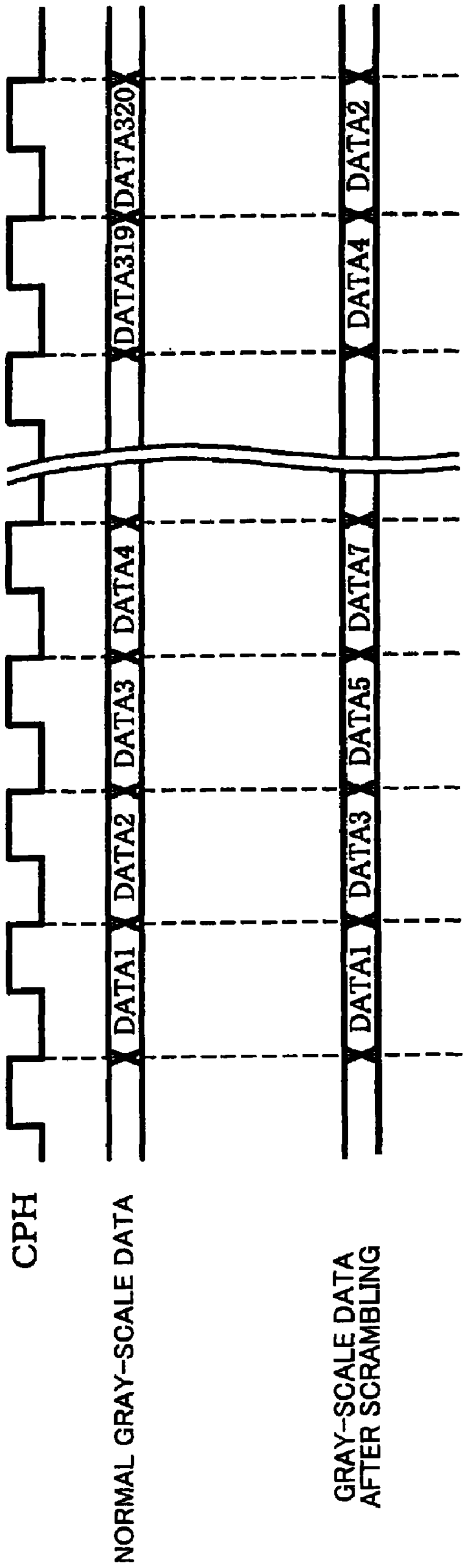
FIG. 5 is illustrative of the necessity of data scrambling for driving a comb-tooth distributed LCD panel.

As shown in FIG. 5, a general-purpose controller supplies gray-scale data DATA1 to DATA320 respectively corresponding to the data lines DL1 to DL320 to the data driver 30 in synchronization with a reference clock signal CPH. In the case where the data driver 30 drives the LCD panel which is not comb-tooth distributed as shown in FIG. 3, the data output section OUT1 is connected with the data line DL1, the data output section OUT2 is connected with the data line DL2, . . . , and the data output section OUT320 is connected with the data line DL320, whereby an image can be displayed without causing a problem. However, in the case where the data driver 30 drives the comb-tooth distributed LCD panel as shown in FIG. 1 or 4, the data output section OUT1 is connected with the data line DL1, the data output section OUT2 is connected with the data line DL3, . . . , and the data output section OUT320 is connected with the data line DL2. Therefore, a desired image cannot be displayed.

Therefore, it is necessary to change the arrangement of the gray-scale data as shown in FIG. 5 by performing scramble processing of changing the order of the gray-scale data. Therefore, in the case of driving the comb-tooth distributed LCD panel by using a data driver controlled by a general-purpose controller, a dedicated data scramble IC which performs the scramble processing must be added, whereby the mounting area is inevitably increased.

According to the data driver 30 in this embodiment, the comb-tooth distributed LCD panel can be driven based on the gray-scale data supplied from a general-purpose controller.

The period between the timing at which a signal (enable input/output signal EIO) which indicates the supply start timing of the gray-scale data is output and the timing at which the gray-scale data is output to the data driver 30 corresponding to the signal differs depending on the type of controller. Therefore, the timing at which the gray-scale data supplied to the gray-scale bus is captured depends on the type of controller which supplies the gray-scale data. Therefore, in the case of capturing the gray-scale data for driving the comb-tooth distributed data lines while changing the arrangement order of the gray-scale data, the order of the captured gray-scale data may differ from the correct order.

The data driver 30 in this embodiment is capable of driving the comb-tooth distributed data lines independent of the supply timing of the gray-scale data.

2. Data Driver

Figure 6:
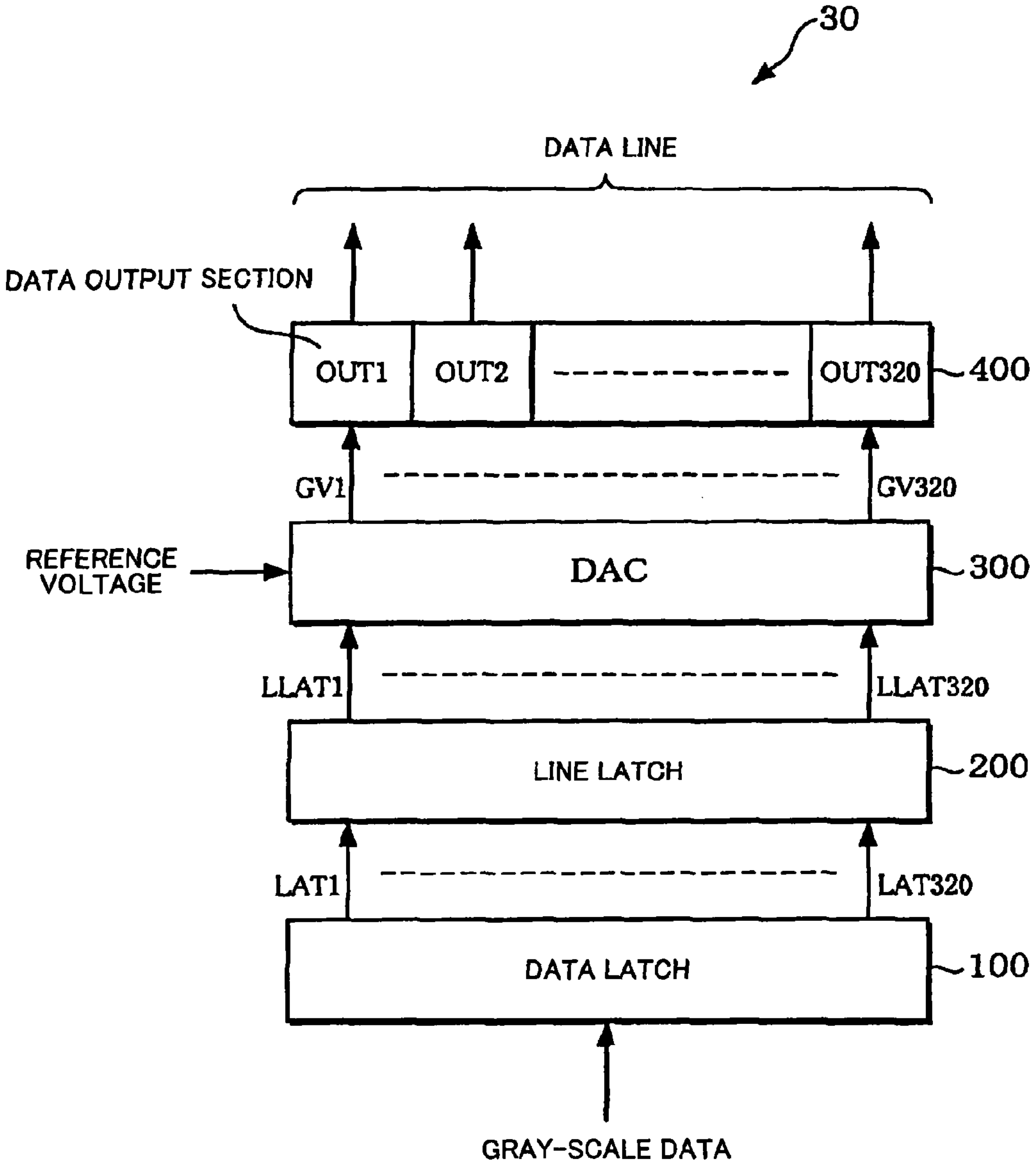
FIG. 6 is a diagram schematically showing a configuration of a data driver in an embodiment of the present invention.

FIG. 6 shows an outline of a configuration of the data driver 30 in this embodiment. The data driver 30 includes a data latch 100, a line latch 200, a digital-to-analog converter (DAC) 300 (voltage select circuit in a broad sense), and a data line driver circuit 400.

The data latch 100 captures the gray-scale data in one horizontal scanning cycle.

The line latch 200 latches the gray-scale data captured by the data latch 100 based on the horizontal synchronization signal HSYNC.

The DAC 300 outputs a drive voltage (gray-scale voltage) corresponding to the gray-scale data output from the line latch 200 selected from among a plurality of reference voltages corresponding to the gray-scale data in units of data lines. In more detail, the DAC 300 decodes the gray-scale data, and selects one of the reference voltages based on the decoded result. The reference voltage selected by the DAC 300 is output to the data line driver circuit 400 as the drive voltage.

The data line driver circuit 400 includes 320 data output sections OUT1 to OUT320. The data line driver circuit 400 drives the data lines DL1 to DLN based on the drive voltage output from the DAC 300 through the data output sections OUT1 to OUT320. In the data line driver circuit 400, the data output sections (OUT1 to OUT320) are disposed corresponding to the arrangement order of the data lines, each of the data output sections OUT driving the data line based on the gray-scale data (latch data). The above description illustrates the case where the data line driver circuit 400 includes the 320 data output sections OUT1 to OUT320. However, the number of data output sections is not limited thereto.

Figure 7:
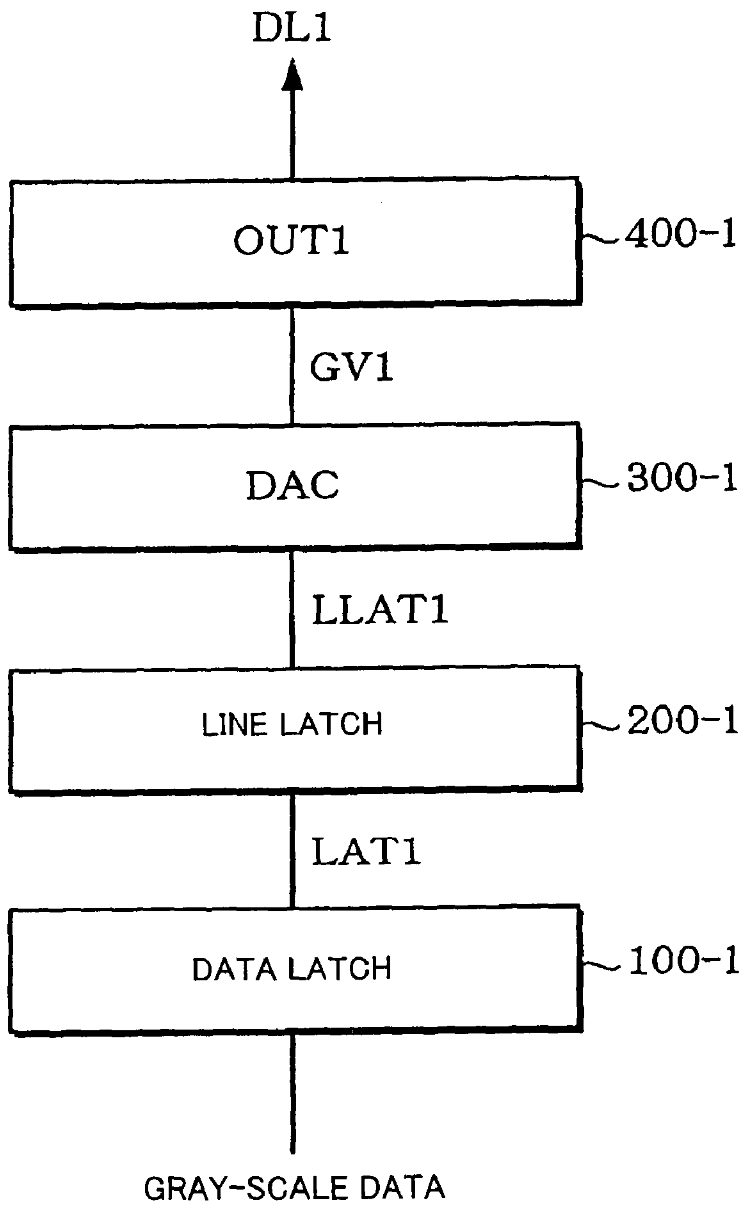
FIG. 7 is a diagram schematically showing a configuration of a data driver for one output.

FIG. 7 shows an outline of a configuration of the data driver 30 for one output.

The data latch 100-1 captures the gray-scale data for one pixel on the gray-scale bus to which the gray-scale data is supplied corresponding to the arrangement order of the data lines of the LCD panel, for example. In the case where one pixel consists of RGB color component pixels, the data latch 100-1 captures the gray-scale data for three dots. The gray-scale data captured by the data latch 100-1 is supplied to the line latch 200-1 as latch data LAT1.

The line latch 200-1 latches the latch data LAT1 captured by the data latch 100-1 based on the horizontal synchronization signal HSYNC. The gray-scale data latched by the line latch 200-1 is supplied to the DAC 300-1 as latch data LLAT1.

The DAC 300-1 generates a drive voltage GV1 corresponding to the latch data LLAT1. In more detail, the DAC 300-1 generates the drive voltage GV1 corresponding to the gray-scale data for each dot in the latch data LLAT1.

The data line driver circuit 400-1 (data output section OUT1) outputs a data signal to the data line DL1 connected with the data output section OUT1 based on the drive voltage GV1 output from the DAC 300-1.

A detailed configuration of the data driver 30 in this embodiment is described below in contrast to a data driver in a comparative example.

Figure 8:
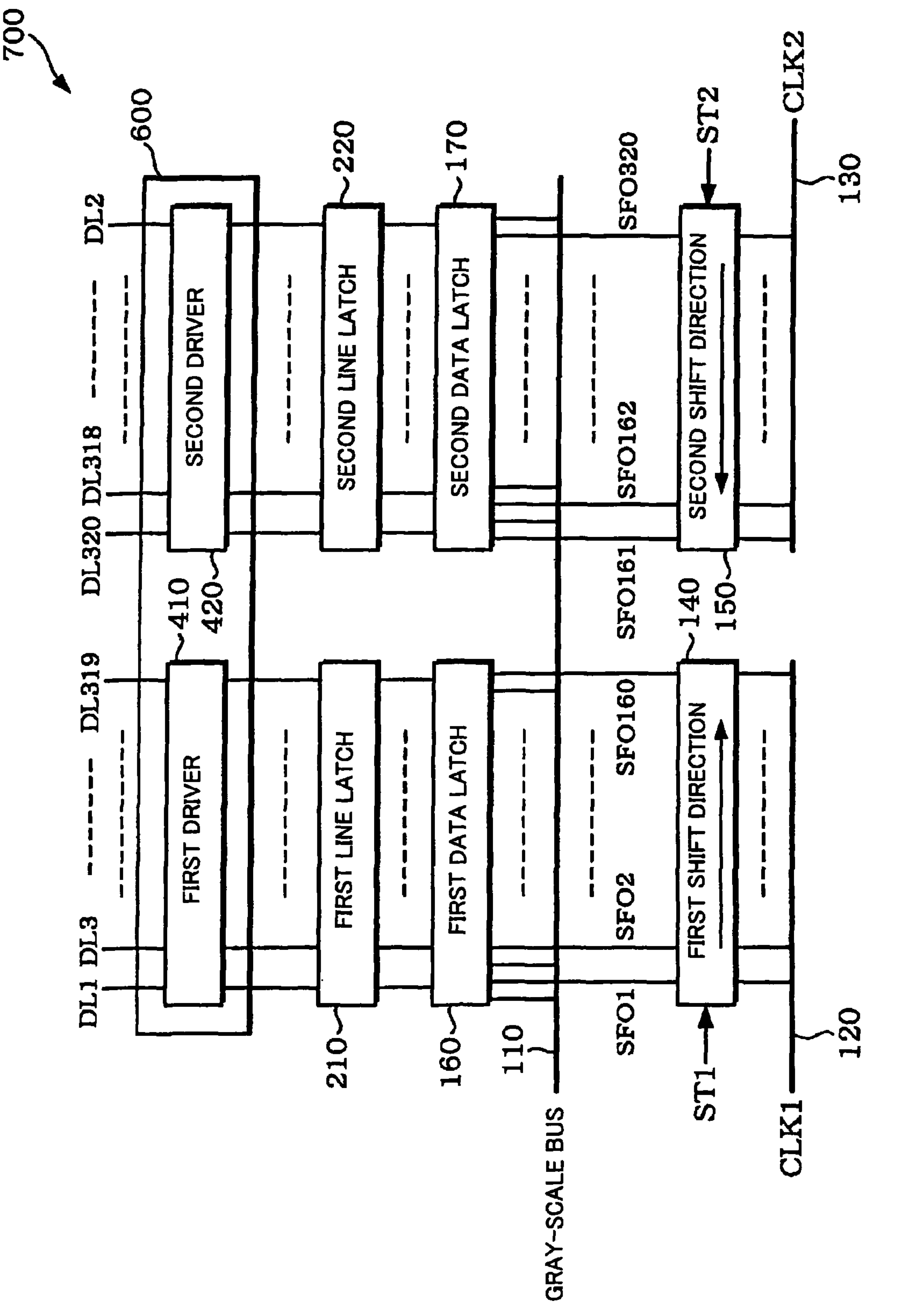
FIG. 8 is a block diagram of a configuration of a data driver in a comparative example.

FIG. 8 shows a detailed configuration example of a data driver in the comparative example.

A data driver 700 in the comparative example drives the comb-tooth distributed data lines of the LCD panel 20 instead of the data driver 30 shown in FIG. 1 or 4.

The data driver 700 includes a gray-scale bus 110, first and second clock lines 120 and 130, first and second shift registers 140 and 150, first and second data latches 160 and 170, first and second line latches 210 and 220, and a data line driver section 600. The data line driver circuit 600 includes first and second driver circuits 410 and 420.

The gray-scale data is supplied to the gray-scale bus 110 corresponding to the arrangement order of the data lines DL1 to DLN. A first shift clock signal CLK1 is supplied to the first clock line 120. A second shift clock signal CLK2 is supplied to the second clock line 130.

The first shift register 140 includes a plurality of flip-flops. The first shift register 140 shifts a first shift start signal ST1 (first capture instruction signal) in a first shift direction based on the first shift clock signal CLK1, and outputs a shift output from each flip-flop. The first shift direction may be the direction from the first side to the second side of the LCD panel 20. Shift outputs SFO1 to SFO160 from the first shift register 140 are output to the first data latch 160.

Figure 9:
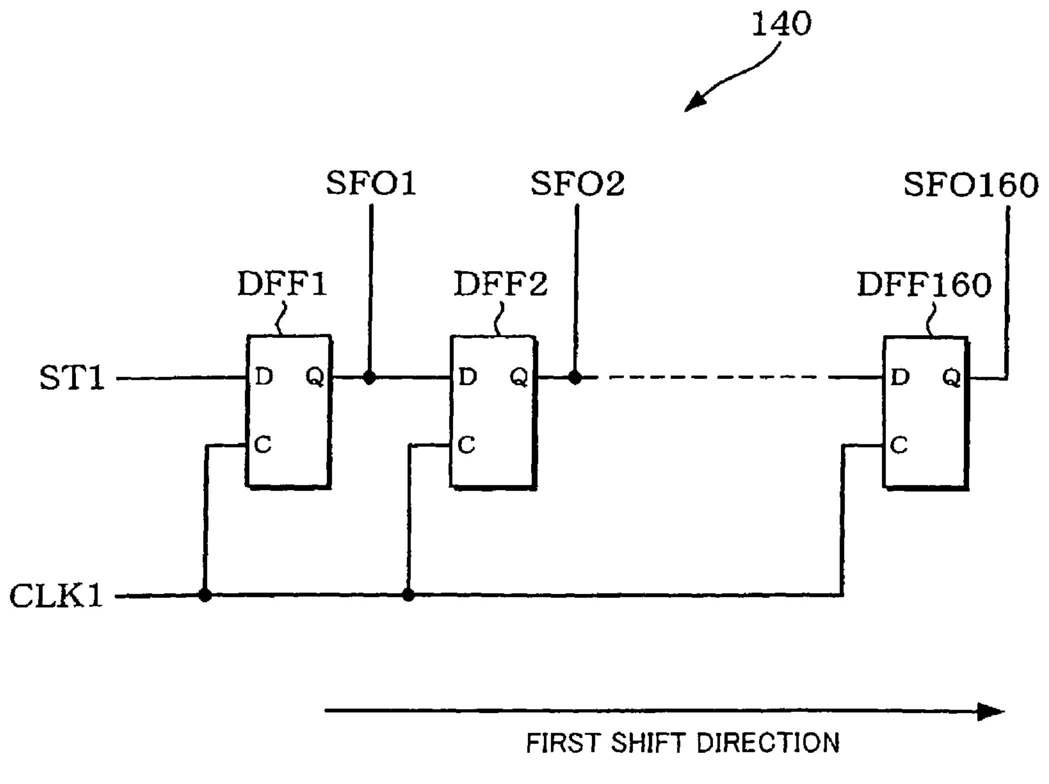
FIG. 9 is a circuit diagram showing a configuration example of a first shift register.

FIG. 9 shows a configuration example of the first shift register 140. In the first shift register 140, D flip-flops (hereinafter abbreviated as "DFF") DFF1 to DFF160 are connected in series so that the first shift start signal ST1 is shifted in the first shift direction. A Q terminal of the D flip-flop DFFk ($1 \leqq k \leqq 159$, k is a natural number) is connected with a D terminal of the D flip-flop DFF(k+1) in the subsequent stage. Each DFF captures and holds a signal input to the D terminal at the rising edge of a signal input to a C terminal, and outputs the held signal from the Q terminal as the shift output SFO.

In FIG. 8, the second shift register 150 includes a plurality of flip-flops. The second shift register 150 shifts a second shift start signal ST2 (second capture instruction signal) in a second shift direction opposite to the first direction based on the second shift clock signal CLK2, and outputs a shift output from each flip-flop. The second shift direction may be the direction from the second side to the first side of the LCD panel 20. Shift outputs SFO161 to SFO320 from the second shift register 150 are output to the second data latch 170.

Figure 10:
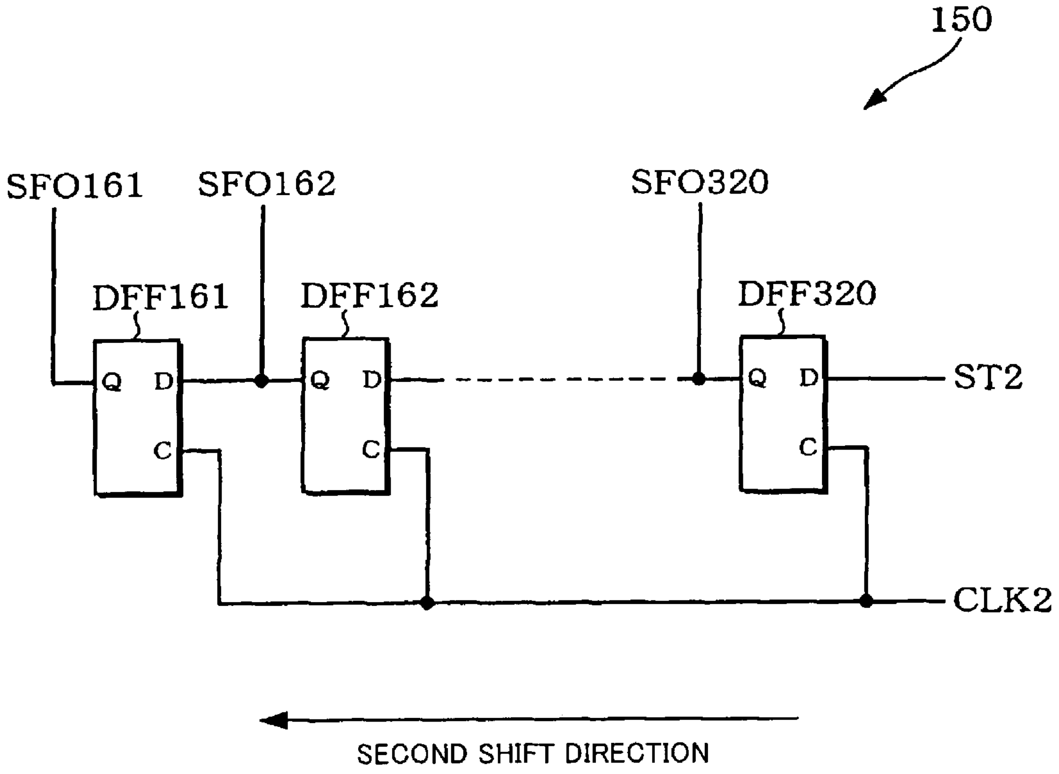
FIG. 10 is a circuit diagram showing a configuration example of a second shift register.

FIG. 10 shows a configuration example of the second shift register 150. In the second shift register 150, D flip-flops DFF320 to DFF161 are connected in series so that the second shift start signal ST2 is shifted in the second shift direction. A Q terminal of the D flip-flop DFFj ($162 \leqq j \leqq 320$, j is a natural number) is connected with a D terminal of the D flip-flop DFF(j−1) in the subsequent stage. Each DFF captures and holds a signal input to the D terminal at the rising edge of a signal input to a C terminal, and outputs the held signal from the Q terminal as the shift output SFO.

In FIG. 8, the first data latch 160 includes a plurality of flip-flops FF1 to FF160 (not shown) which respectively correspond to the data output sections OUT1 to OUT160. The flip-flop FFi ($1 \leqq i \leqq 160$) holds the gray-scale data on the gray-scale bus 110 based on the shift output SFOi from the first shift register 140. The gray-scale data held by the flip-flops of the first data latch 160 is output to the first line latch 210 as the latch data LAT1 to LAT160.

The second data latch 170 includes a plurality of flip-flops FF161 to FF320 (not shown) which respectively correspond to the data output sections OUT161 to OUT320. The flip-flop FFi ($161 \leqq i \leqq 320$) holds the gray-scale data on the gray-scale bus 110 based on the shift output SFOi from the second shift register 150. The gray-scale data held by the flip-flops of the second data latch 170 is output to the second line latch 220 as the latch data LAT161 to LAT320.

The first and second line latches 210 and 220 hold the gray-scale data held by the first and second data latches 160 and 170 based on the horizontal synchronization signal HSYNC. The gray-scale data held by the first and second line latches 210 and 220 is supplied to the data line driver section 600.

The data line driver circuit 600 has the same function as the DAC 300 and the data line driver circuit 400 shown in FIG. 6. The first driver circuit 410 drives the data lines DL1, DL3, . . . , and DL319 (data lines in the first group) based on the gray-scale data held by the first line latch 210. The second driver circuit 420 drives the data lines DL320, DL318, . . . , DL4, and DL2 (data lines in the second group) based on the gray-scale data held by the second line latch 220.

As described above, the first and second data latches 160 and 170 can capture the gray-scale data on the gray-scale bus 110 connected in common with the first and second data latches 160 and 170 based on the shift outputs which can be generated separately. This enables the latch data corresponding to each data output section to be captured in the first and second data latches 160 and 170 while changing the arrangement order of the gray-scale data on the gray-scale bus.

Figure 11A:
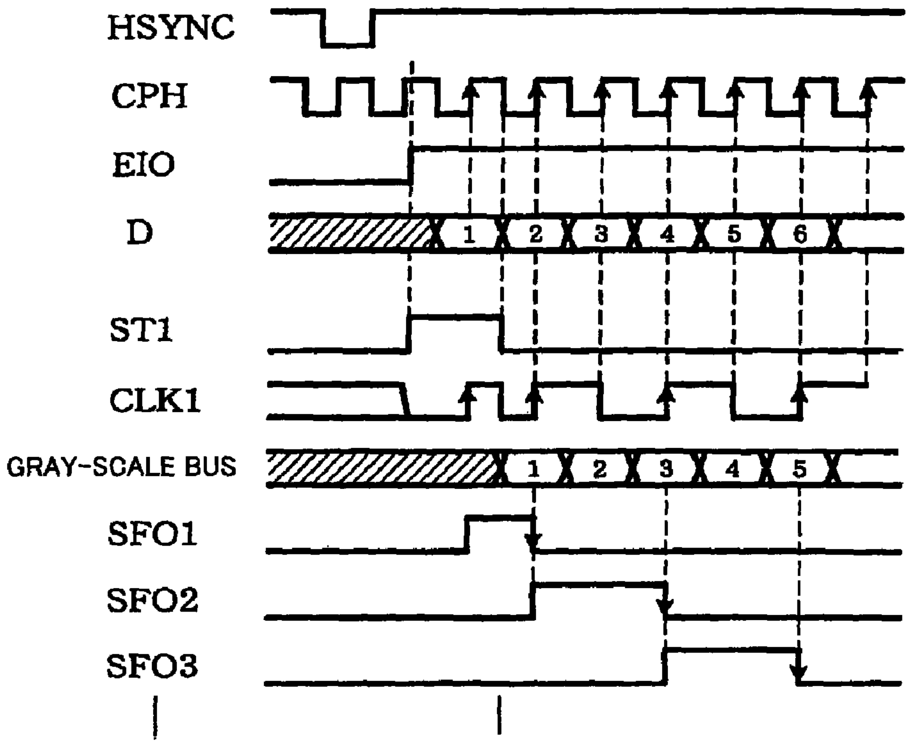
FIGS. 11A and 11B are timing diagrams showing operation examples of a data driver in a comparative example.
Figure 11B:
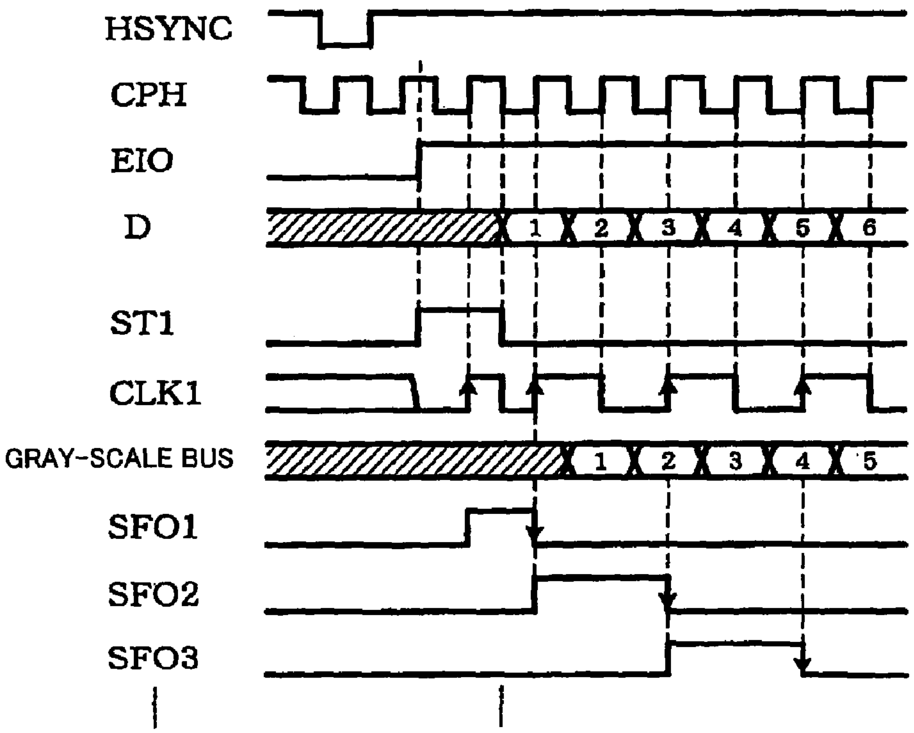

FIGS. 11A and 11B show timing diagrams of operation examples of the data driver 700 shown in FIG. 8. In FIGS. 11A and 11B, the gray-scale data DATA1 for driving the data line DL1 is indicated by "1", and the gray-scale data DATA2 for driving the data line DL2 is indicated by "2". FIGS. 11A and 11B show timing examples in which the gray-scale data is captured in the first data latch 160.

In FIG. 11A, when a negative-logic pulse of the horizontal synchronization signal HSYNC is input, the data driver 700 drives the data lines based on the gray-scale data for the horizontal scanning period, and starts capturing the gray-scale data for the next horizontal scanning period.

The enable input/output signal EIO and the gray-scale data (D) corresponding to the enable input/output signal EIO are supplied to the data driver 700 from the controller. The gray-scale data (D) is supplied in synchronization with the reference clock signal CPH.

In the data driver 700, the first shift start signal ST1 is generated based on the enable input/output signal EIO. In the data driver 700, the gray-scale data (D) from the controller is latched based on the reference clock signal CPH, and the latched gray-scale data is output to the gray-scale bus 110.

A first shift clock signal CLK1 is supplied to the first clock line 120. The first shift clock signal CLK1 has a pulse for capturing the first shift start signal ST1 in the first stage capture period, and becomes a frequency-divided clock signal based on the rising edge of the reference clock signal CPH in the data capture period.

In the first shift register 140, after the first shift start signal ST1 is captured in the first stage capture period, the shift outputs SFO1, SFO2, . . . , and SFO160 are output in the data capture period in synchronization with the frequency-divided clock signal.

In the first data latch 160, the flip-flop FFi ($1 \leqq i \leqq 160$) captures the gray-scale data on the gray-scale bus 110 at the falling edge of the shift output SFOi. Therefore, the gray-scale data DATA1 on the gray-scale bus 110 is captured at the falling edge of the shift output SFO1, the gray-scale data DATA3 on the gray-scale bus 110 is captured at the falling edge of the shift output SFO2, and the gray-scale data DATA319 on the gray-scale bus 110 is captured at the falling edge of the shift output SFO160.

FIG. 11A shows capture timing of the gray-scale data in the first data latch 160. The above description also applies to the timing at which the gray-scale data is captured in the second data latch 170. However, the second shift start signal ST2 is a signal having the same phase as the first shift start signal ST1, and the second shift clock signal CLK2 supplied to the second clock line 130 has a rising edge for capturing the second shift start signal ST2 in the first stage capture period, and becomes a frequency-divided clock signal having a phase which is the reverse of the phase of the first shift clock signal CLK1 in the data capture period.

Therefore, in the second shift register 150, after the second shift start signal ST2 is captured in the first stage capture period, the shift outputs SFO320, SFO319, . . . , and SFO161 are output in the data capture period in synchronization with the frequency-divided clock signal.

In the second data latch 170, the flip-flop FFi ($161 \leqq i \leqq 320$) captures the gray-scale data on the gray-scale bus 110 at the falling edge of the shift output SFOi. Therefore, the gray-scale data DATA2 on the gray-scale bus 110 is captured at the falling edge of the shift output SFO320, the gray-scale data DATA4 on the gray-scale bus 110 is captured at the falling edge of the shift output SFO319, and the gray-scale data DATA320 on the gray-scale bus 110 is captured at the falling edge of the shift output SFO161.

As described above, the comb-tooth distributed LCD panel 20 can be driven without using a data scramble IC by driving the data lines from the first side of the LCD panel 20 (electro-optical device) based on the data (LAT1 to LAT160) held by the flip-flops of the first data latch 160 and driving the data lines from the second side of the LCD panel 20 (electro-optical device) based on the data (LAT161 to LAT320) held by the flip-flops of the second data latch 170.

However, FIG. 11B differs from FIG. 11A in the period between the timing at which the controller outputs the enable input/output signal EIO and the timing at which the gray-scale data is output to the data driver corresponding to the enable input/output signal EIO.

In this case, since the output timing of the shift outputs SFO1, SFO2, . . . , and SFO160 is the same as the output timing shown in FIG. 11A, the gray-scale data on the gray-scale bus 110 cannot be captured correctly. Therefore, a correct image cannot be displayed by driving the comb-tooth distributed data lines.

In the data driver 30 in this embodiment, a capture start timing setting register and a capture instruction signal generation circuit are provided so that the first and second shift start signals ST1 and ST2 which are delayed in relation to the enable input/output signal EIO for a period corresponding to data set in the capture start timing setting register can be generated. This enables the gray-scale data for driving the comb-tooth distributed data lines to be captured in the correct order, independent of the supply timing of the gray-scale data which differs depending on the controller.

Figure 12:
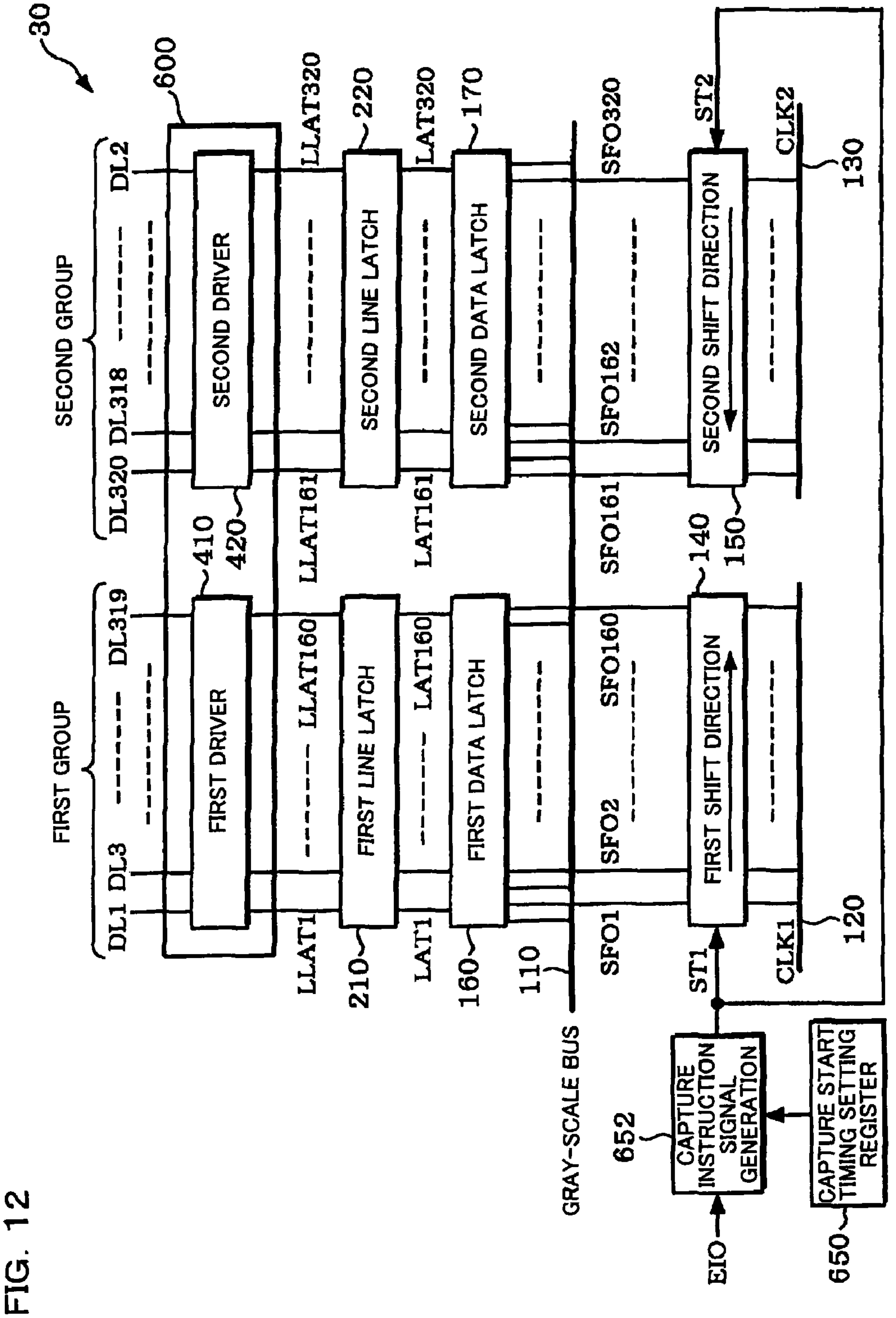
FIG. 12 is a block diagram of a configuration of a data driver in an embodiment of the present invention.

FIG. 12 shows a detailed configuration example of the data driver 30 in this embodiment. In FIG. 12, sections the same as the sections of the data driver 700 in the comparative example shown in FIG. 8 are indicated by the same symbols. Description of these sections is appropriately omitted.

The data latch 100 shown in FIG. 6 includes the gray-scale bus 110, the first and second clock lines 120 and 130, the first and second shift registers 140 and 150, and the first and second data latches 160 and 170 shown in FIG. 12. The data latch 100 shown in FIG. 6 also includes a capture start timing setting register 650 and a capture instruction signal generation circuit 652 shown in FIG. 12. The line latch 200 shown in FIG. 6 includes the first and second line latches 210 and 220 shown in FIG. 12.

The DAC 300 and the data line driver circuit 400 shown in FIG. 6 correspond to the data line driver section 600 shown in FIG. 12. The first driver circuit 410 corresponds to the data output sections OUT1 to OUT160. The second driver circuit 420 corresponds to the data output sections OUT161 to OUT320.

The data driver 30 in this embodiment differs from the data driver 700 in the comparative example shown in FIG. 8 in that the data driver 30 includes the capture start timing setting register 650 and the capture instruction signal generation circuit 652. The first and second shift start signals ST1 and ST2 (first and second capture instruction signals) generated by the capture instruction signal generation circuit 652 are supplied to the first and second shift registers 140 and 150.

Data for setting the capture start timing of the gray-scale data based on the signal which indicates the supply start timing of the gray-scale data (enable input/output signal EIO) supplied from the controller or the like is set in the capture start timing setting register 650. The data is set by the host or the controller. For example, the controller sets the contents set therein by the host in the capture start timing setting register 650 of the data driver 30.

The capture instruction signal generation circuit 652 generates the first and second shift start signals ST1 and ST2 (first and second capture instruction signals) which are delayed in relation to the enable input/output signal EIO (signal which indicates the supply start timing of the gray-scale data) for a period corresponding to the data set in the capture start timing setting register 650. The first and second shift start signals ST1 and ST2 become signals having the same phase by utilizing the first and second shift clock signals CLK1 and CLK2. In this example, the first and second shift start signals ST1 and ST2 are signals having the same phase. However, the present invention is not limited thereto.

The first shift register 140 shifts the first shift start signal ST1 in the first shift direction based on the first shift clock signal CLK1, and sequentially outputs the shift outputs SFO1, SFO2, . . . , and SFO160. Therefore, the first data latch 160 captures the gray-scale data on the gray-scale bus 110 at the capture timing based on the first shift start signal ST1 (first capture instruction signal).

The second shift register 150 shifts the second shift start signal ST2 in the second shift direction based on the second shift clock signal CLK2, and sequentially outputs the shift outputs SFO320, SFO319, . . . , and SFO161. Therefore, the second data latch 170 captures the gray-scale data on the gray-scale bus 110 at the capture timing based on the second shift start signal ST2 (second capture instruction signal).

Figure 13:
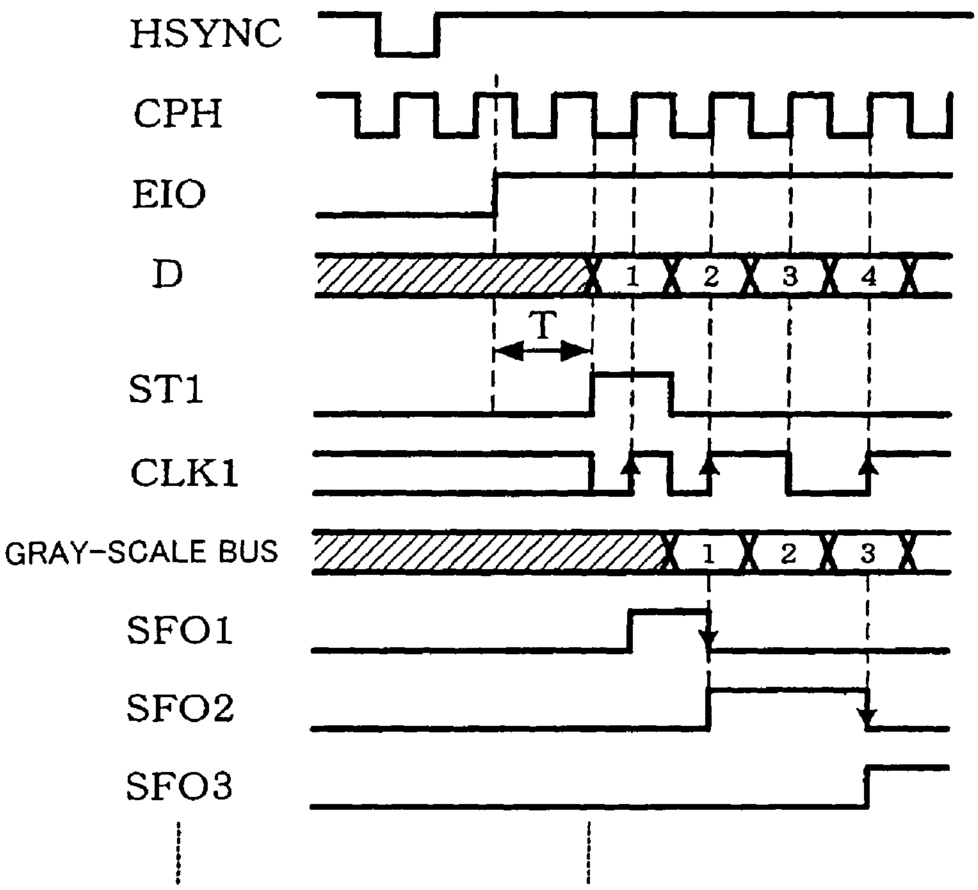
FIG. 13 is a timing diagram showing an operation example of a data driver in an embodiment of the present invention.

FIG. 13 shows a timing diagram of an operation example of the data driver 30 shown in FIG. 12. In FIG. 13, the gray-scale data DATA1 for driving the data line DL1 is indicated by "1", and the gray-scale data DATA2 for driving the data line DL2 is indicated by "2". FIG. 13 shows a timing example in which the gray-scale data is captured in the first data latch 160.

In FIG. 13, when a negative-logic pulse of the horizontal synchronization signal HSYNC is input, the data driver 30 drives the data lines based on the gray-scale data for the horizontal scanning period, and starts capturing the gray-scale data for the next horizontal scanning period.

The enable input/output signal EIO and the gray-scale data (D) corresponding to the enable input/output signal EIO are supplied to the data driver 30 from the controller. The gray-scale data (D) is supplied in synchronization with the reference clock signal CPH.

In the data driver 30, data corresponding to a period T in FIG. 13 (the number of clock pulses "1" of the reference clock signal CPH, for example) is set in advance in the capture start timing setting register 650 by the controller.

In the data driver 30, the first shift start signal ST1 is generated based on the enable input/output signal EIO. In the data driver 30, the capture instruction signal generation circuit 652 generates the first and second shift start signals ST1 and ST2 which are delayed in relation to the enable input/output signal EIO for the period T corresponding to the contents of the capture start timing setting register 650.

In the data driver 30, the gray-scale data (D) from the controller is latched based on the reference clock signal CPH, and the latched gray-scale data is output to the gray-scale bus 110.

In the first shift register 140, after the first shift start signal ST1 is captured in the first stage capture period, the shift outputs SFO1, SFO2, . . . , and SFO160 are output in the data capture period in synchronization with the frequency-divided clock signal.

In the first data latch 160, the flip-flop FFi ($1 \leqq i \leqq 160$) captures the gray-scale data on the gray-scale bus 110 at the falling edge of the shift output SFOi. Therefore, the gray-scale data DATA1 on the gray-scale bus 110 is captured at the falling edge of the shift output SFO1, the gray-scale data DATA3 on the gray-scale bus 110 is captured at the falling edge of the shift output SFO2, and the gray-scale data DATA319 on the gray-scale bus 110 is captured at the falling edge of the shift output SFO160.

FIG. 13 shows the capture timing of the gray-scale data in the first data latch 160. However, the above description also applies to the timing at which the gray-scale data is captured in the second data latch 170. Therefore, in the second shift register 150, after the second shift start signal ST2 is captured in the first stage capture period, the shift outputs SFO320, SFO319, . . . , and SFO161 are output in the data capture period in synchronization with the frequency-divided clock signal.

In the second data latch 170, the flip-flop FFi ($161 \leqq i \leqq 320$) captures the gray-scale data on the gray-scale bus 110 at the falling edge of the shift output SFOi. Therefore, the gray-scale data DATA2 on the gray-scale bus 110 is captured at the falling edge of the shift output SFO320, the gray-scale data DATA4 on the gray-scale bus 110 is captured at the falling edge of the shift output SFO319, . . . , and the gray-scale data DATA320 on the gray-scale bus 110 is captured at the falling edge of the shift output SFO161.

As described above, since the first and second shift start signals ST1 and ST2 which are delayed in relation to the enable input/output signal EIO according to the contents of the capture start timing setting register 650 are generated in the data driver 30, the gray-scale data on the gray-scale bus 110 can be captured correctly, differing from FIG. 11B.

A detailed configuration example of the capture instruction signal generation circuit 652 is described below.

Figure 14:
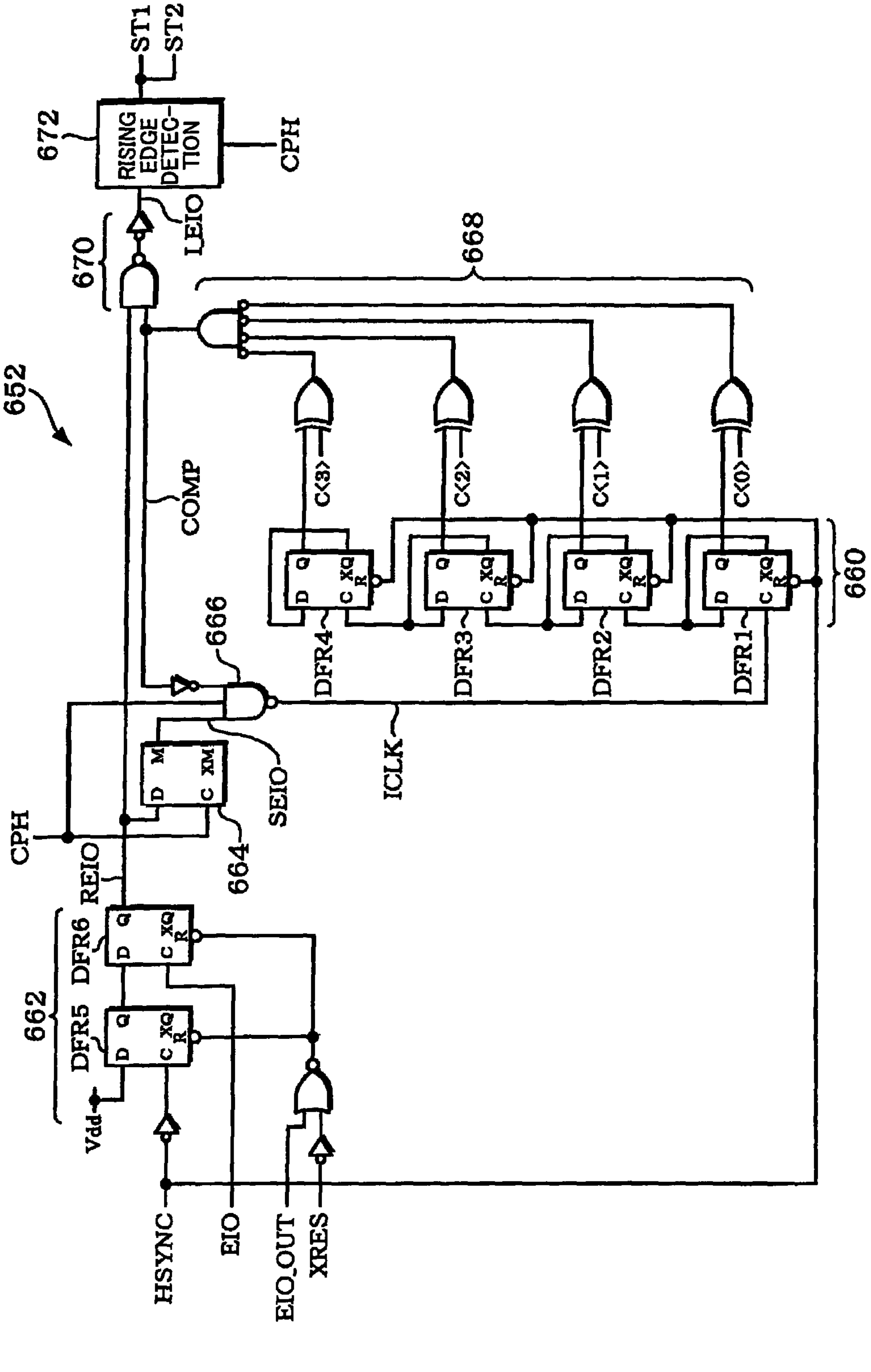
FIG. 14 is a circuit diagram showing a configuration example of a capture instruction signal generation circuit.

FIG. 14 shows a circuit configuration example of the capture instruction signal generation circuit 652 shown in FIG. 12. In FIG. 14, 4-bit data is set in the capture start timing setting register 650.

The capture instruction signal generation circuit 652 includes a ripple counter 660 (counter in a broad sense) which counts the reference clock signal CPH (or clock signal corresponding to the reference clock signal CPH). The capture instruction signal generation circuit 652 starts counting by using the ripple counter 660 based on the enable input/output signal EIO (signal which indicates the supply start timing of the gray-scale data), and generates the first and second shift start signals ST1 and ST2 which change in level on condition that the counter value reaches a first counter value corresponding to the data set in the capture start timing setting register 650.

The ripple counter 660 includes D flip-flops DFR1 to DFR4 which are D flip-flops (DFF) with a reset. Each D flip-flop DFR holds a signal input to a D terminal at the rising edge of a signal input to a C terminal, outputs the held signal from a Q terminal, and outputs an inversion signal of the held signal from an XQ terminal. The D flip-flop DFR is reset when a signal input to an R terminal is set at the "L" level. In the D flip-flops DFR1 to DFR4, the XQ terminal is connected with the D terminal. The XQ terminal of each of the D flip-flops DFR1 to DFR3 is connected with the C terminal of the D flip-flop DFR in the subsequent stage. The horizontal synchronization signal HSYNC is input in common to the R terminals of the D flip-flops DFR1 to DFR4.

In FIG. 14, the ripple counter 660 counts an internal clock signal ICLK corresponding to the reference clock signal CPH when the enable input/output signal EIO is input after a predetermined sequence by a sequence detection circuit 662.

The sequence detection circuit 662 includes D flip-flops DFR5 and DFR6. A system power supply voltage Vdd is supplied to a D terminal of the D flip-flop DFR5. An inversion signal of the horizontal synchronization signal HSYNC is supplied to a C terminal of the D flip-flop DFR5. A D terminal of the D flip-flop DFR6 is connected with a Q terminal of the D flip-flop DFR5. The enable input/output signal EIO is supplied to a C terminal of the D flip-flop DFR6. A detection signal REIO which indicates whether or not the sequence detection circuit 662 has detected a predetermined sequence is output from a Q terminal of the D flip-flop DFR6. The NOR operation result of an inversion signal of an inverted reset signal XRES and an EIO output signal EIO_OUT is supplied to R terminals of the D flip-flops DFR5 and DFR6. The EIO output signal EIO_OUT is the enable input/output signal (EIO) to the subsequent data driver in the case where the data drivers are cascade-connected, or a signal which indicates that the data driver is full of the captured gray-scale data. The inverted reset signal XRES is an initialization signal for the data driver 30.

In the sequence detection circuit 662 having the above-described configuration, the positive-logic enable input/output signal EIO rises after the negative-logic horizontal synchronization signal HSYNC has risen, and the detection signal REIO which indicates that the reference clock signal CPH has risen is output.

The capture instruction signal generation circuit 652 includes a D latch 664. The D latch 664 outputs a signal input to a D terminal from an M terminal when a signal input to a C terminal is at the "H" level. The D latch 664 holds a signal input to the D terminal when the logic level of the signal input to the C terminal changes to the "L" level from the "H" level, and outputs the held signal from the M terminal. The Q terminal of the D flip-flop DFR6 is connected with the D terminal of the D latch 664. The reference clock signal CPH is supplied to the C terminal of the D latch 664. A detection latch signal SEIO is output from the M terminal of the D latch.

The reference clock signal CPH, the detection latch signal SEIO, and an inversion signal of a comparison result signal COMP are input to a first mask circuit 666. The first mask circuit 666 outputs the NAND operation result of the reference clock signal CPH, the detection latch signal SEIO, and the inversion signal of the comparison result signal COMP as the internal clock signal ICLK.

The comparison result signal COMP is generated by a comparison circuit 668. The comparison circuit 668 compares a signal output from the Q terminal of each of the D flip-flops DFR1 to DFR4 with each bit of the data C<3:0> set in the capture start timing setting register 650, and outputs the comparison result signal.

The internal clock signal ICLK supplied to the ripple counter 660 from the first mask circuit 666 after a predetermined sequence is detected by the sequence detection circuit 662 is masked by the comparison result signal COMP. In more detail, after the counter value of the ripple counter 660 has reached the set data (first counter value) corresponding to the period T, the internal clock signal ICLK (reference clock signal) input to the ripple counter 660 is fixed to stop the counter operation. This prevents an unnecessary counter operation, whereby power consumption can be reduced.

The detection signal REIO from the sequence detection circuit 662 and the comparison result signal COMP are input to a second mask circuit 670. The second mask circuit 670 outputs the AND operation result of the detection signal REIO and the comparison result signal COMP as an internal enable input/output signal I_EIO. Specifically, the capture instruction signal generation circuit 652 generates the first and second shift start signals ST1 and ST2 (first and second capture instruction signals) while masking the detection signal REIO generated based on the enable input/output signal EIO (signal which indicates the supply start timing of the gray-scale data) until the counter value of the ripple counter 660 reaches the set data (first counter value) corresponding to the period T.

Figure 15:
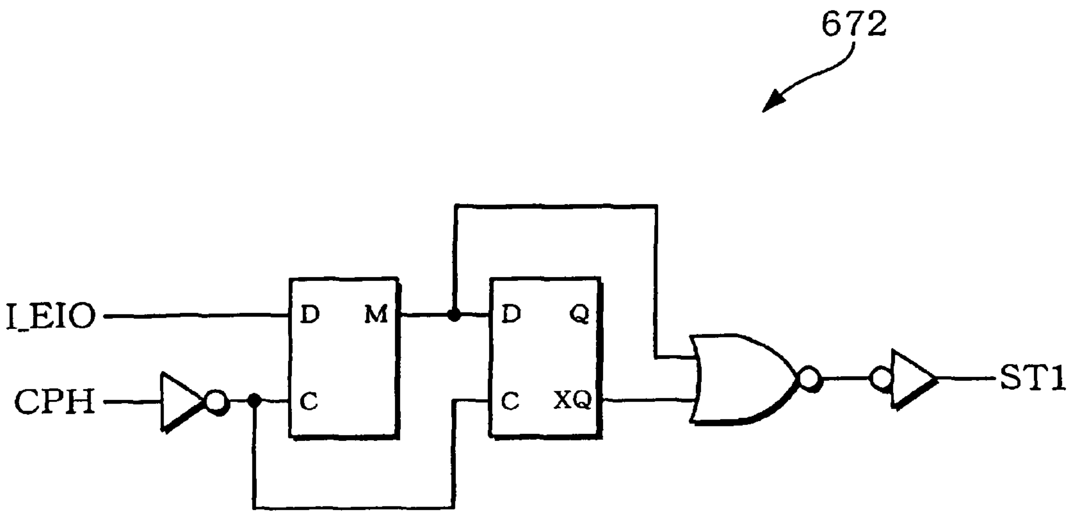
FIG. 15 is a circuit diagram showing a configuration example of a rising edge detection circuit.

In FIG. 14, the first and second shift start signals ST1 and ST2 are generated by a rising edge detection circuit 672. The rising edge detection circuit 672 detects a rising edge of the internal enable input/output-signal I_EIO, and generates a positive-logic pulse when the rising edge is detected. The rising edge detection circuit 672 may be realized by using a configuration shown in FIG. 15, for example.

Figure 16A:
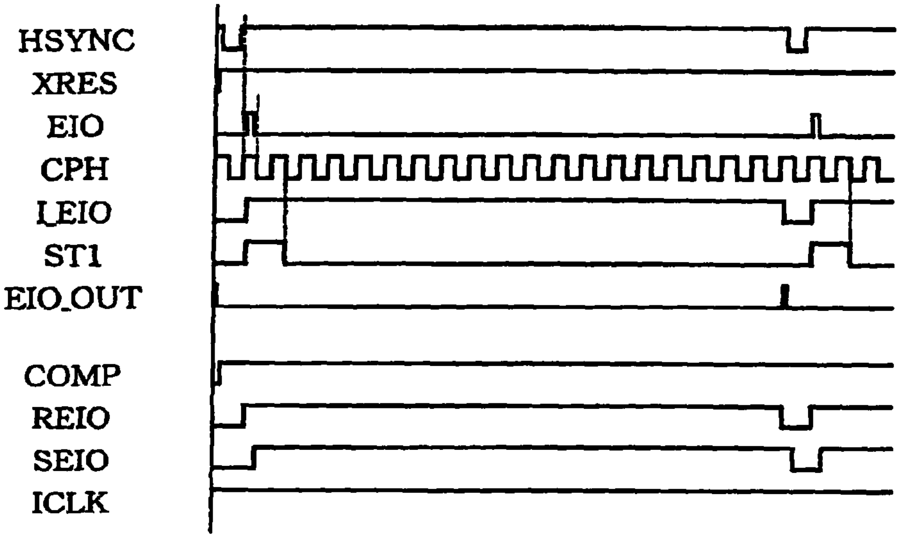
FIGS. 16A and 16B are timing diagrams of first and second operation examples of a capture instruction signal generation circuit.
Figure 16B:
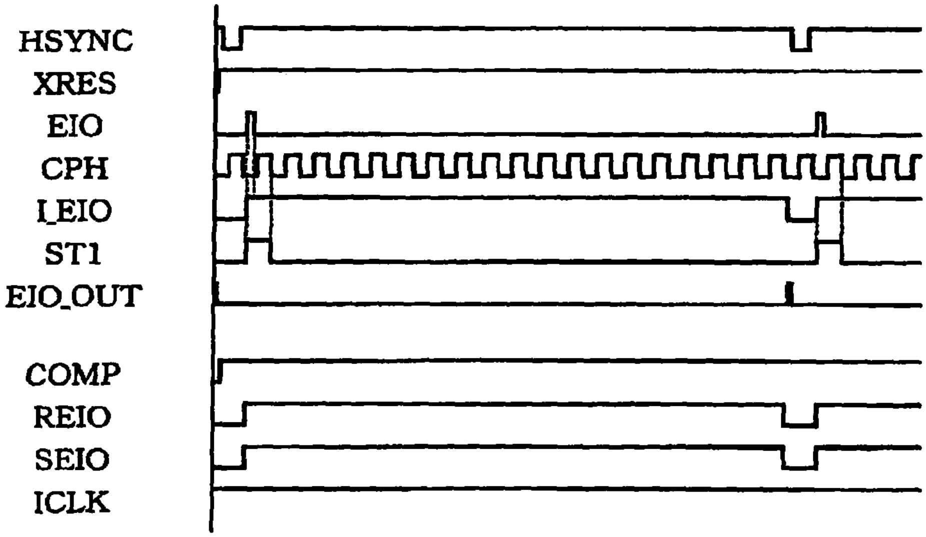

FIGS. 16A and 16B show timing diagrams of first and second operation examples of the capture instruction signal generation circuit 652 shown in FIG. 14. FIG. 16A shows an operation example in which "0" is set in the capture start timing setting register 650, and the enable input/output signal EIO is input when the reference clock signal CPH is set at the "H" level. FIG. 16B shows an operation example in which "0" is set in the capture start timing setting register 650, and the enable input/output signal EIO is input when the reference clock signal CPH is set at the "L" level.

The internal enable input/output signal I_EIO rises when the enable input/output signal EIO is input, and a pulse corresponding to the rising edge of the internal enable input/output signal I_EIO is output as the first shift start signal ST1. FIGS. 16A and 16B show only the first shift start signal ST1. However, the above description also applies to the second shift start signal ST2.

Figure 17A:
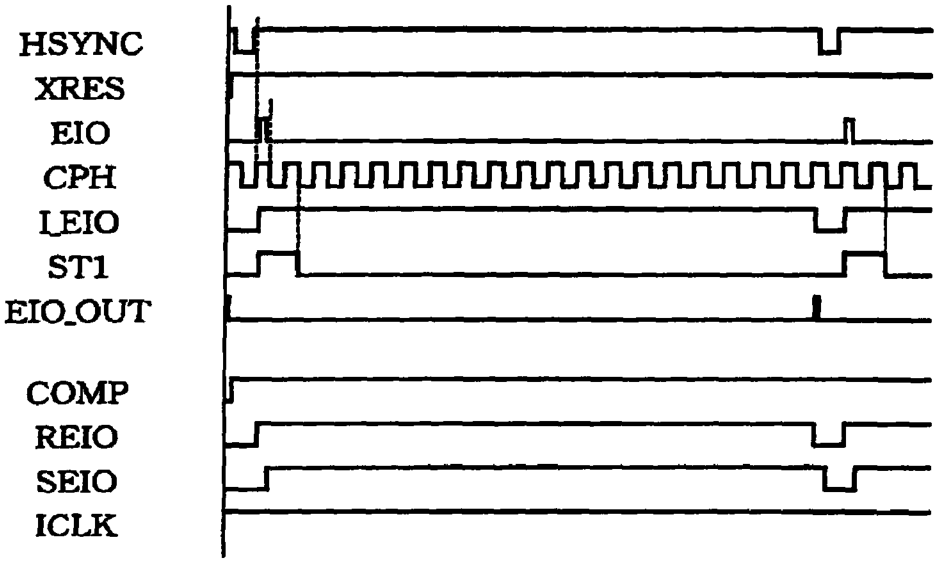
FIGS. 17A and 17B are timing diagrams of third and fourth operation examples of a capture instruction signal generation circuit.
Figure 17B:
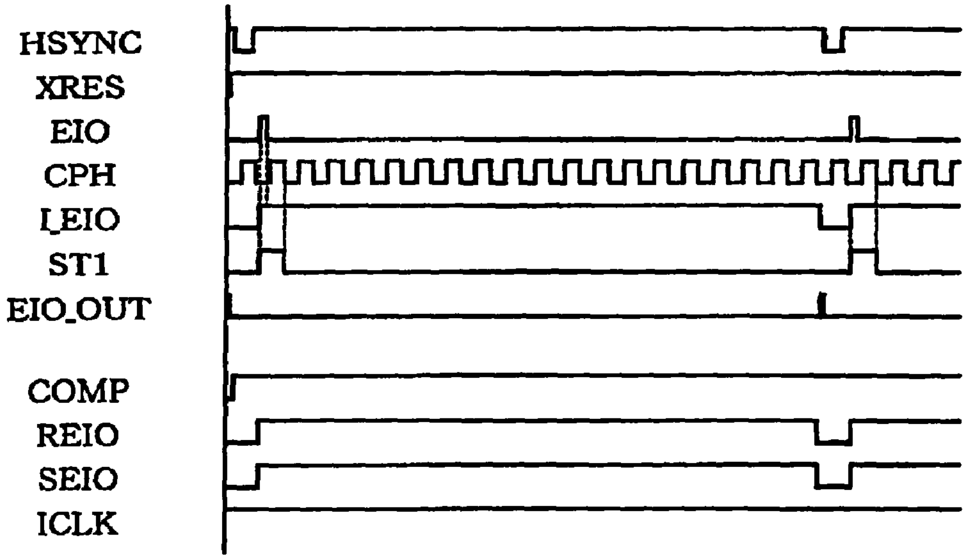

FIGS. 17A and 17B show timing diagrams of third and fourth operation examples of the capture instruction signal generation circuit 652 shown in FIG. 14. FIG. 17A shows an operation example in which "2" is set in the capture start timing setting register 650, and the enable input/output signal EIO is input when the reference clock signal CPH is set at the "H" level. FIG. 17B shows an operation example in which "8" is set in the capture start timing setting register 650, and the enable input/output signal EIO is input when the reference clock signal CPH is set at the "L" level.

In FIG. 17A, after the enable input/output signal EIO has been input, the internal enable input/output signal I_EIO is set at the "H" level at the second falling edge of the reference clock signal CPH. A pulse corresponding to the rising edge of the internal enable input/output signal I_EIO is output as the first shift start signal ST1.

In FIG. 17B, after the enable input/output signal EIO has been input, the internal enable input/output signal I_EIO is set at the "H" level in synchronization with the falling edge of the reference clock signal CPH that comes right after the eighth rising edge of the reference clock signal CPH. A pulse corresponding to the rising edge of the internal enable input/output signal I_EIO is output as the first shift start signal ST1.

FIGS. 17A and 17B show only the first shift start signal ST1. However, the same description applies to the second shift start signal ST2.

In the data driver 30 shown in FIG. 12, it is preferable that the first and second shift start signals ST1 and ST2 be signals having the same phase. This is because it is necessary to separately generate the first and second shift start signals ST1 and ST2.

If the first and second shift start signals ST1 and ST2 are signals having the same phase, it is necessary to generate the first and second shift clock signals CLK1 and CLK2 for capturing the first and second shift start signals ST1 and ST2 in the first stages of the first and second shift registers 140 and 150, respectively. Therefore, it is preferable that the data driver 30 include a shift clock generation circuit as described below.

Figure 18:
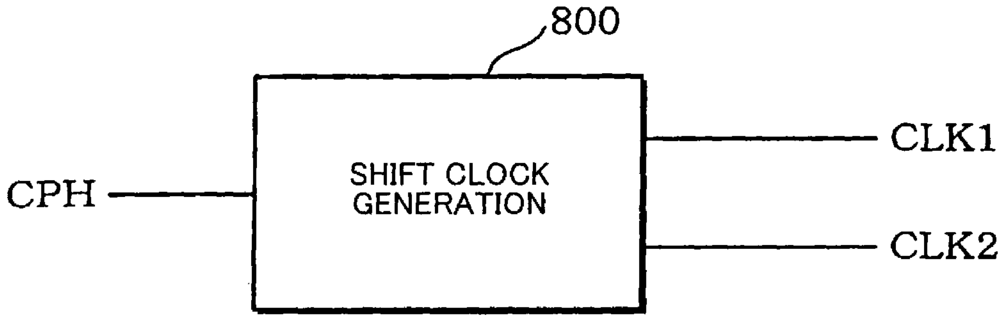
FIG. 18 is a configuration diagram of a shift clock generation circuit.

FIG. 18 shows an outline of a configuration of a shift clock generation circuit.

A shift clock generation circuit 800 generates the first and second shift clock signals CLK1 and CLK2 based on the reference clock signal CPH with which the gray-scale data is supplied in synchronization. The shift clock generation circuit 800 generates the first and second shift clock signals CLK1 and CLK2 so that the first and second shift clock signals CLK1 and CLK2 include a period in which the phases of the first and second shift clock signals CLK1 and CLK2 are reversed.

The first and second shift start signals ST1 and ST2 become signals having the same phase by generating the first and second shift clock signals CLK1 and CLK2 in this manner, whereby the configuration and control can be simplified.

Figure 19:
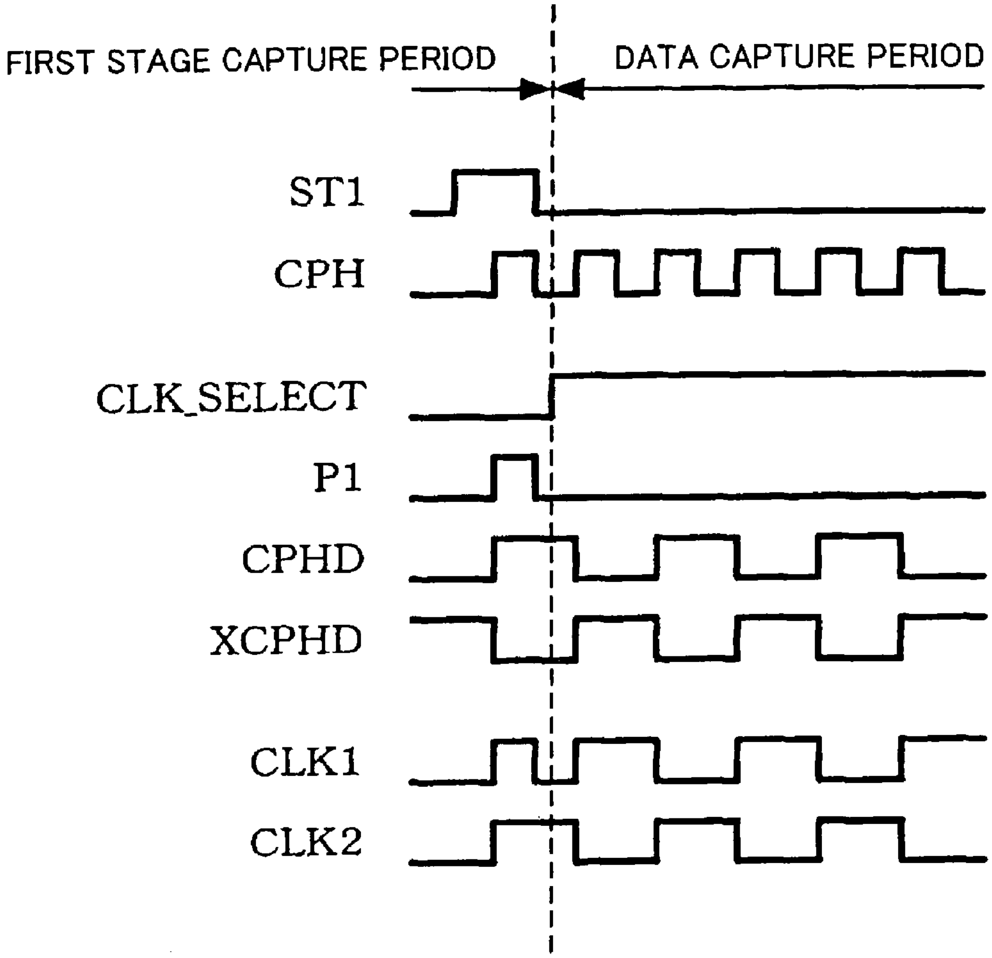
FIG. 19 is a timing diagram showing an example of generation timing of first and second shift clock signals by a shift clock generation circuit.

FIG. 19 shows an example of generation timing of the first and second shift clock signals CLK1 and CLK2 by the shift clock generation circuit 800.

The shift clock generation circuit 800 generates a clock select signal CLK_SELECT which specifies the first stage capture period and the data capture period (shift operation period). The first stage capture period may be referred to as a period in which the first shift start signal ST1 is captured in the first shift register 140, or a period in which the second shift start signal ST2 is captured in the second shift register 150. The data capture period may be referred to as a period in which the shift start signal captured in the first stage capture period is shifted after the first stage capture period has elapsed.

The first and second shift clock signals CLK1 and CLK2 are provided with edges for respectively capturing the first and second shift start signals ST1 and ST2 by using the clock select signal CLK_SELECT.

Therefore, a pulse P1 of the reference clock signal CPH is generated in the first stage capture period. A frequency-divided clock signal CPHD is generated by dividing the frequency of the reference clock signal CPH. The frequency-divided clock signal CPHD becomes the second shift clock signal CLK2. An inverted frequency-divided clock signal XCPHD is generated by reversing the phase of the frequency-divided clock signal CPHD.

The first shift clock signal CLK1 is generated by selectively outputting the pulse P1 of the reference clock signal CPH in the first stage capture period and selectively outputting the inverted frequency-divided clock signal XCPHD in the data capture period by using the clock select signal CLK_SELECT.

Figure 20:
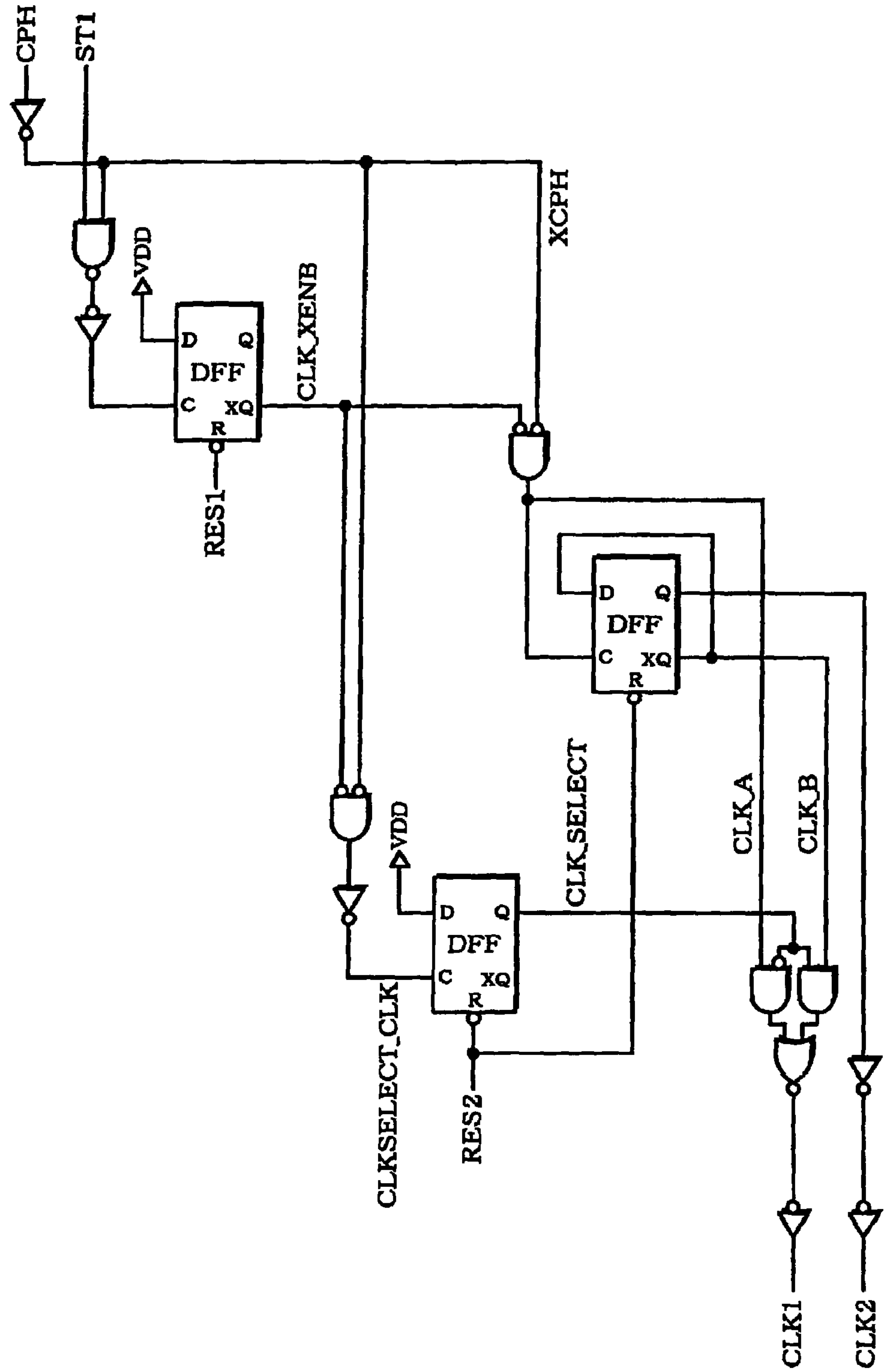
FIG. 20 is a circuit diagram showing a configuration example of a shift clock generation circuit.

FIG. 20 shows a circuit diagram which is a specific configuration example of the shift clock generation circuit 800.

Figure 21:
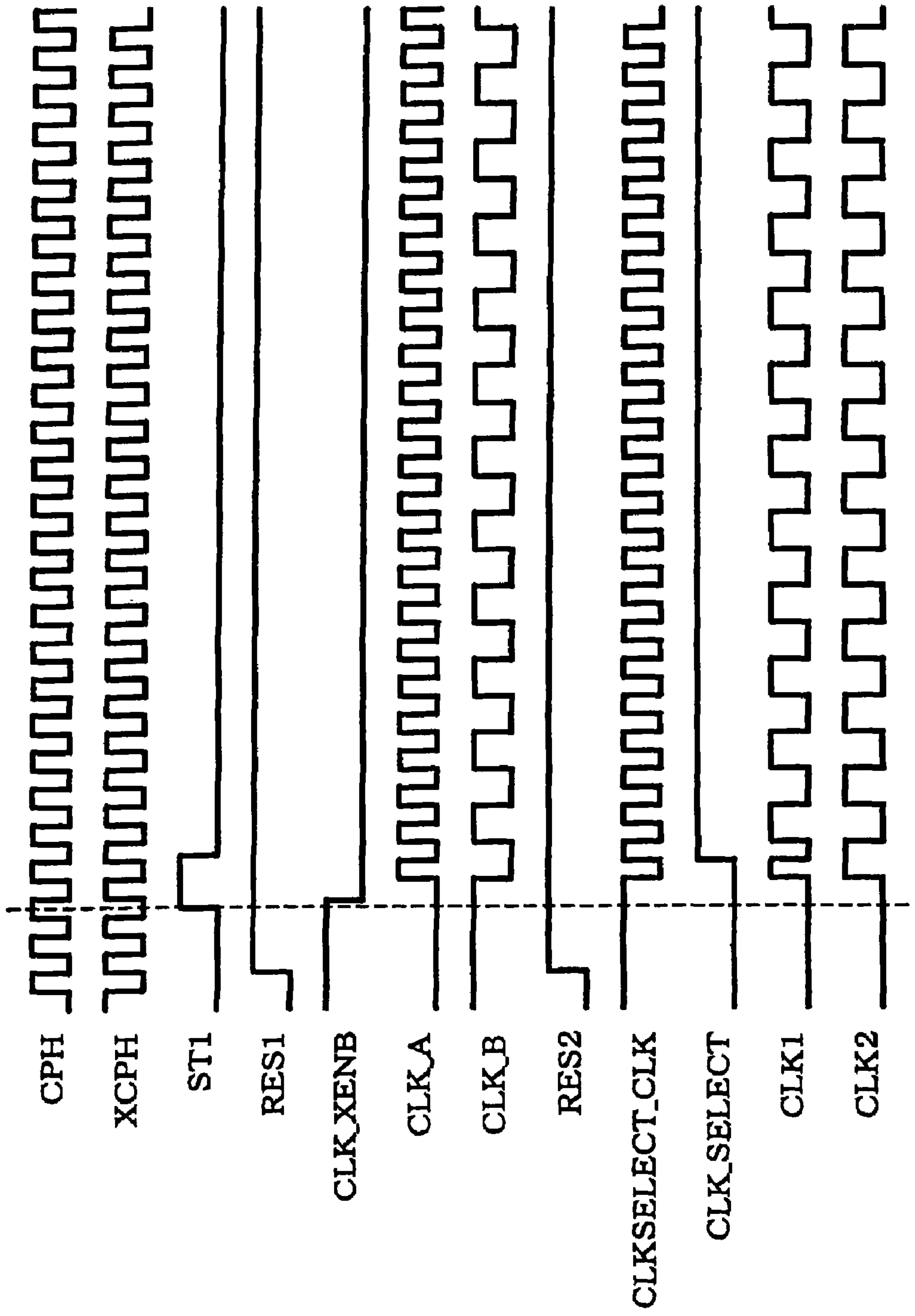
FIG. 21 is a timing diagram of an operation example of the shift clock generation circuit shown in FIG. 20.

FIG. 21 shows an example of operation timing of the shift clock generation circuit 800 shown in FIG. 20.

In FIGS. 20 and 21, clock signals CLK_A and CLK_B are generated by using the reference clock signal CPH, and selectively output by using the clock signal select signal CLK_SELECT. The second shift clock signal CLK2 is a signal generated by reversing the clock signal CLK_B. The first shift clock signal CLK1 is a signal generated by selectively outputting the clock signal CLK_A in the first stage capture period in which the clock select signal CLK_SELECT is set at an "L" level, and selectively outputting the clock signal CLK_B in the data capture period in which the clock select signal CLK_SELECT is set at an "H" level.

The data latch 100 of the data driver 30 operates as described below by using the first and second shift start signals ST1 and ST2 and the first and second shift clock signals CLK1 and CLK2.

Figure 22:
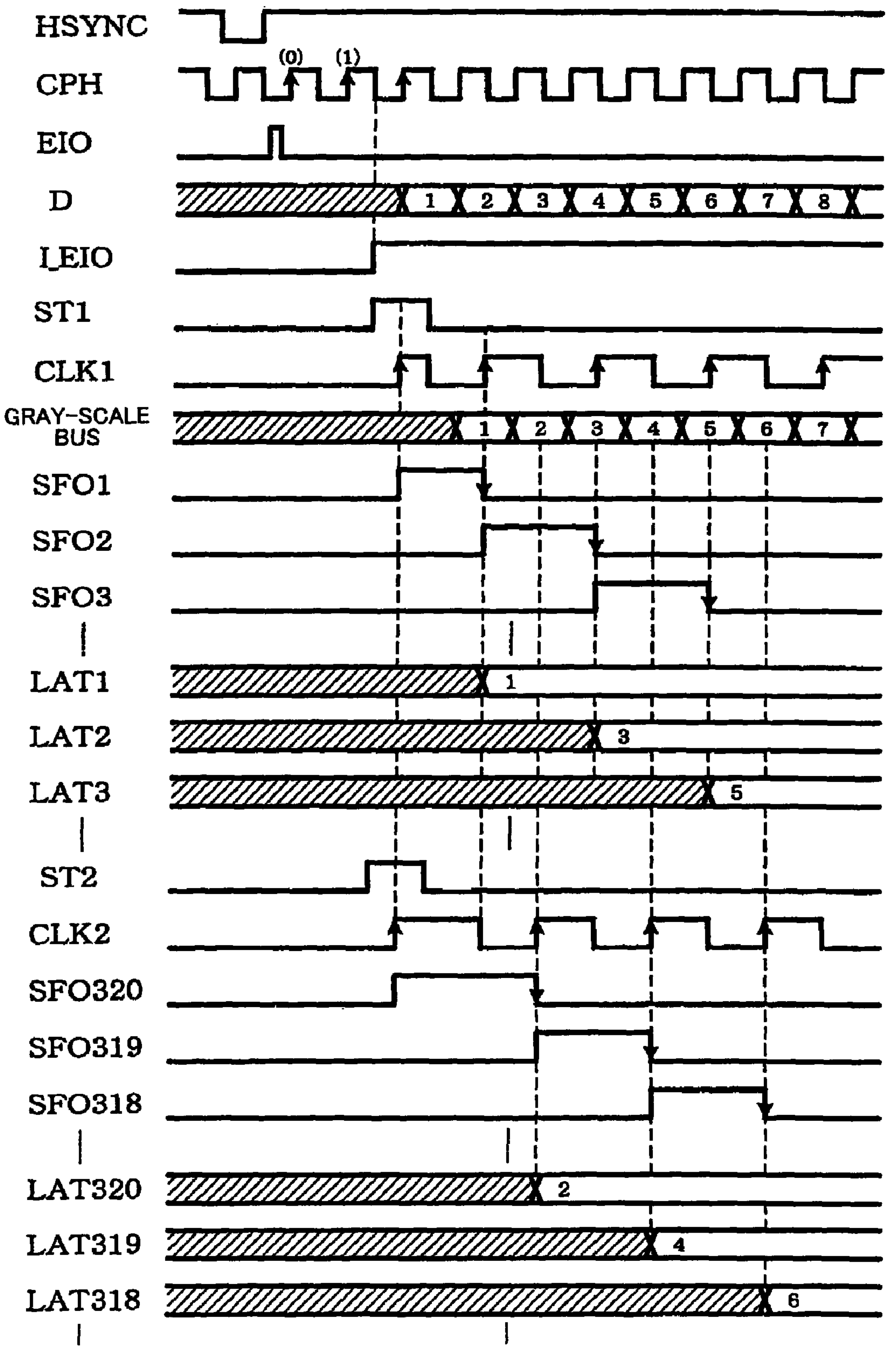
FIG. 22 is a timing diagram showing an example of an operation of a data latch of a data driver in an embodiment of the present invention.

FIG. 22 shows an example of operation timing of the data latch 100 of the data driver 30.

In this example, "2" is set in the capture start timing setting register 650. The gray-scale data corresponding to the data line DL1 is illustrated as DATA1 ("1" in FIG. 22), and the gray-scale data corresponding to the data line DL2 is illustrated as DATA2 ("2" in FIG. 22). The gray-scale data is output to the gray-scale bus 110 in synchronization with the reference clock signal CPH.

In FIG. 22, after the enable input/output signal EIO has been input, the internal enable input/output signal I_EIO is set at an "H" level at the second falling edge of the reference clock signal CPH. A pulse corresponding to the rising edge of the internal enable input/output signal I_EIO is output as the first shift start signal ST1. The second shift start signal ST2 is output as a signal having the same phase as the first shift start signal ST1.

The first shift register 140 shifts the first shift start signal ST1 in synchronization with the rising edge of the first shift clock signal CLK1. As a result, the first shift register 140 outputs the shift outputs SFO1 to SFO160 in that order.

The second shift register 150 shifts the second shift start signal ST2 in synchronization with the rising edge of the second shift clock signal CLK2 during the shift operation of the first shift register 140. As a result, the second shift register 150 outputs the shift outputs SFO320 to SFO161 in that order.

The first data latch 160 captures the gray-scale data on the gray-scale bus 110 at the falling edge of each shift output from the first shift register 140. As a result, the first data latch 160 captures the gray-scale data DATA1 at the falling edge of the shift output SFO1, captures the gray-scale data DATA3 at the falling edge of the shift output SFO2, and captures the gray-scale data DATA5 at the falling edge of the shift output SFO3.

The second data latch 170 captures the gray-scale data on the gray-scale bus 110 at the falling edge of each shift output from the second shift register 150. As a result, the second data latch 170 captures the gray-scale data DATA2 at the falling edge of the shift output SFO320, captures the gray-scale data DATA4 at the falling edge of the shift output SFO319, and captures the gray-scale data DATA6 at the falling edge of the shift output SFO318.

This enables the gray-scale data to be captured after data scrambling (see FIG. 5) corresponding to the data lines of the comb-tooth distributed LCD panel 20. Therefore, the gray-scale data DATA1 to DATA320 is supplied to the corresponding data lines DL1 to DL320 of the LCD panel 20 shown in FIG. 1 or 4, whereby a correct image can be displayed. The gray-scale data can be captured in the correct order for driving the comb-tooth distributed data lines, even if the period between the change point of the enable input/output signal EIO from the controller and the timing at which the gray-scale data starts to be supplied from the controller differs depending on the controller.

The present invention is not limited to the above-described embodiment. Various modifications and variations are possible within the spirit and scope of the present invention. The above embodiment is described taking an active matrix type liquid crystal panel in which each pixel of the display panel includes a TFT as an example. However, the present invention is not limited thereto. The present invention may also be applied to a passive matrix type liquid crystal display. The present invention may be applied to a plasma display device in addition to a liquid crystal panel, for example.

In the case of forming one pixel using three dots, the present invention can be realized in the same manner as described above by replacing the data line with a set of three color component data lines.

This embodiment illustrates an example in which the first and second shift directions are the directions shown in FIG. 12. However, the present invention is not limited thereto.

Part of requirements of any claim of the present invention could be omitted from a dependent claim which depends on that claim. Moreover, part of requirements of any independent claim of the present invention could be made to depend on any other independent claim.

The following items are disclosed relating to the above-described embodiment.

One embodiment of the present invention provides a data driver which drives a plurality of data lines of an electro-optical device which includes a plurality of scan lines, the data lines and a plurality of pixels, the data lines being comb-tooth distributed in units of a predetermined number of the data lines, the data driver including:

a gray-scale bus to which gray-scale data is supplied corresponding to an arrangement order of each of the data lines;

a capture start timing setting register in which is set data for setting capture start timing of the gray-scale data based on a signal which indicates supply start timing of the gray-scale data;

a capture instruction signal generation circuit which generates first and second capture instruction signals which are delayed in relation to the signal which indicates the supply start timing of the gray-scale data for a period corresponding to the data set in the capture start timing setting register;

a first data latch which captures the gray-scale data on the gray-scale bus at capture timing based on the first capture instruction signal;

a second data latch which captures the gray-scale data on the gray-scale bus at capture timing based on the second capture instruction signal;

a first driver circuit which drives a data line belonging to a first group among the plurality of data lines based on the gray-scale data captured in the first data latch; and a second driver circuit which drives a data line belonging to a second group among the plurality of data lines based on the gray-scale data captured in the second data latch.

The signal which indicates the supply start timing of the gray-scale data is supplied from a controller connected with the data driver, for example.

The amount of time difference between the signal which indicates the supply start timing of the gray-scale data and the gray-scale data which is the capture target may be set in the capture start timing setting register.

The shift direction of the first shift register and the shift direction of the second shift register may be opposite directions.

In this embodiment, the capture instruction signal generation circuit generates the first and second capture instruction signals which are delayed in relation to the signal which indicates the supply start timing of the gray-scale data according to the data set in the capture start timing setting register. This enables a correct image to be displayed by driving the comb-tooth distributed data lines without using a data scramble IC. Moreover, capturing the gray-scale data can be started at timing corresponding to the type of the controller, even if the period between the timing at which the signal which indicates the supply start timing of the gray-scale data is instructed to be supplied and the timing at which the gray-scale data is actually supplied differs depending on the type of the controller. Therefore, correct gray-scale data can be captured even in the case of changing the arrangement order of the gray-scale data supplied to the gray-scale bus for driving the comb-tooth distributed data lines, whereby a correct image can be displayed.

With this data driver, the capture instruction signal generation circuit may include a counter which counts a reference clock signal which is in synchronization with timing at which the gray-scale data is supplied, may start counting of the counter based on the signal which indicates the supply start timing of the gray-scale data, and may generate the first and second capture instruction signals which change in level on condition that a counter value of the counter reaches a first counter value corresponding to the data set in the capture start timing setting register.

With this data driver, the capture instruction signal generation circuit may generate the first and second capture instruction signals by masking the signal which indicates the supply start timing of the gray-scale data during a period before the counter value of the counter reaches the first counter value.

According to this feature, since the first and second capture instruction signals are generated by using the counter, the configuration can be simplified.

With this data driver, a counter operation of the counter may be stopped after the counter value of the counter has reached the first counter value.

According to this feature, power consumption can be reduced by stopping an unnecessary counter operation in addition to a reduction of the size and weight due to comb-tooth distribution of the data lines.

This data driver may include:

a first shift register which includes a plurality of flip-flops, shifts a first capture instruction signal in a first shift direction based on a first shift clock signal, and outputs a shift output from each of the flip-flops;

a second shift register which includes a plurality of flip-flops, shifts a second capture instruction signal in a second shift direction based on a second shift clock signal and outputs a shift output from each of the flip-flops, the second direction being a direction opposite to the first direction;

a first data latch which includes a plurality of flip-flops, each of the flip-flops holding the gray-scale data for the predetermined number of data lines that has been output to the gray-scale bus, based on the shift output from the first shift register; and a second data latch which includes a plurality of flip-flops, each of the flip-flops holding the gray-scale data for the predetermined number of data lines that has been output to the gray-scale bus, based on the shift output from the second shift register, the first driver circuit may include a plurality of data output sections, each of the data output sections driving one of the data lines based on the gray-scale data held by the flip-flop of the first data latch, and the second driver circuit may include a plurality of data output sections, each of the data output sections driving one of the data lines based on the gray-scale data held by the flip-flop of the second data latch.

According to this feature, since the gray-scale data on the gray-scale bus can be captured based on different shift clock signals of the first and second shift clock signals, the configuration of the data driver which drives the comb-tooth distributed data lines can be simplified.

With this data driver, a direction from a first side to a second side of the electro-optical device, in which the data lines extend, may be the same as the first or second shift direction.

With this data driver, when the scan lines extend along a long side of the electro-optical device and the data lines extend along a short side of the electro-optical device, the data driver may be disposed along the short side.

According to this feature, the mounting area of the comb-tooth distributed electro-optical device can be reduced as the number of data lines is increased.

Another embodiment of the present invention provides an electro-optical device including:

a plurality of scan lines;

a plurality of data lines which are comb-tooth distributed in units of a predetermined number of the data lines;

a plurality of pixels;

the above-described data driver which drives the data lines; and a scan driver which scans the scan lines.

A further embodiment of the present invention provides an electro-optical device including:

a display panel which includes a plurality of scan lines, a plurality of data lines which are comb-tooth distributed in units of a predetermined number of the data lines; and a plurality of pixels;

the above-described data driver which drives the data lines; and a scan driver which scans the scan lines.

According to these embodiments, an electro-optical device which displays a correct image by driving the comb-tooth distributed data lines independent of the supply timing of the gray-scale data can be provided.

What is claimed is:

1. A data driver which drives a plurality of data lines of an electro-optical device which includes a plurality of scan lines, the data lines and a plurality of pixels, the data driver comprising:

a gray-scale bus to which gray-scale data is supplied;

a capture start timing setting register in which is set data to set a capture start timing of the gray-scale data, the capture start timing of the gray-scale data being based on a signal indicating a supply start timing of the gray-scale data;

a capture instruction signal generation circuit which generates a first capture instruction signal and a second capture instruction signal, the first capture instruction signal and the second capture instruction signal being generated by delaying the signal indicating a supply start timing of the gray-scale data for a period corresponding to the data set in the capture start timing setting register;

a first data latch which captures the gray-scale data on the gray-scale bus at capture timing based on the first capture instruction signal;

a second data latch which captures the gray-scale data on the gray-scale bus at capture timing based on the second capture instruction signal;

a first driver circuit which outputs first data to a first group among the plurality of data lines, the first data being based on the gray-scale data captured in the first data latch; and a second driver circuit which outputs second data to a second group among the plurality of data lines, the second data being based on the gray-scale data captured in the second data latch.

2. The data driver as defined in claim 1, wherein the capture instruction signal generation circuit includes a counter which counts a reference clock signal which is in synchronization with timing at which the gray-scale data is supplied, starts counting of the counter based on the signal which indicates the supply start timing of the gray-scale data, and generates the first and second capture instruction signals which change in level on condition that a counter value of the counter reaches a first counter value corresponding to the data set in the capture start timing setting register.

3. The data driver as defined in claim 2, wherein the capture instruction signal generation circuit generates the first and second capture instruction signals by masking the signal which indicates the supply start timing of the gray-scale data during a period before the counter value of the counter reaches the first counter value.

4. The data driver as defined in claim 2, wherein a counter operation of the counter is stopped after the counter value of the counter has reached the first counter value.

5. The data driver as defined in claim 1, comprising:

a first shift register which includes a plurality of flip-flops, shifts a first capture instruction signal in a first shift direction based on a first shift clock signal, and outputs a shift output from each of the flip-flops;

a second shift register which includes a plurality of flip-flips, shifts a second capture instruction signal in a second shift direction based on a second shift clock signal and outputs a shift output from each of the flip-flops, the second direction being a direction opposite to the first direction;

a first data latch which includes a plurality of flip-flops, each of the flip-flops holding the gray-scale data for the predetermined number of data lines that has been output to the gray-scale bus, based on the shift output from the first shift register; and a second data latch which includes a plurality of flip-flops, each of the flip-flops holding the gray-scale data for the data lines that has been output to the gray-scale bus, based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

6. The data driver as defined in claim 2, comprising:

a first shift register which includes a plurality of flip-flops, shifts a first capture instruction signal in a first shift direction based on a first shift clock signal, and outputs a shift output from each of the flip-flops;

a second shift register which includes a plurality of flip-flops, shifts a second capture instruction signal in a second shift direction based on a second shift clock signal and outputs a shift output from each of the flip-flops, the second direction being a direction opposite to the first direction;

a first data latch which includes a plurality of flip-flops, each of the flip-flops holding the gray-scale data for the predetermined number of data lines that has been output to the gray-scale bus, based on the shift output from the first shift register, and a second data latch which includes a plurality of flip-flops, each of the flip-flops holding the gray-scale data for the data lines that has been output to the gray-scale bus, based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

7. The data driver as defined in claim 3, comprising:

a first shift register which includes a plurality of flip-flops, shifts a first capture instruction signal in a first shift direction based on a first shift clock signal, and outputs a shift output from each of the flip-flops;

a second shift register which includes a plurality of flip-flops, shifts a second capture instruction signal in a second shift direction based on a second shift clock signal and outputs a shift output from each of the flip-flops, the second direction being a direction opposite to the first direction;

a first data latch which includes a plurality of flip-flops, each of the flip-flops holding the gray-scale data for the predetermined number of data lines that has been output to the gray-scale bus, based on the shift output from the first shift register, and a second data latch which includes a plurality of flip-flops, each of the flip-flops holding the gray-scale data for the data lines that has been output to the gray-scale bus, based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

8. The data driver as defined in claim 4, comprising:

a first shift register which includes a plurality of flip-flops, shifts a first capture instruction signal in a fast shift direction based on a first shift clock signal, and outputs a shift output from each of the flip-flops;

a second shift register which includes a plurality of flip-flops, shifts a second capture instruction signal in a second shift direction based on a second shift clock signal and outputs a shift output from each of the flip-flops, the second direction being a direction opposite to the first direction;

a first data latch which includes a plurality of flip-flops, each of the flip-flops holding the gray-scale data for the data lines that has been output to the gray-scale bus, based on the shift output from the first shift register, and a second data latch which includes a plurality of flip-flops, each of the flip-flops holding the gray-scale data for the data lines that has been output to the gray-scale bus, based on the shift output from the second shift register, wherein the first driver circuit includes a plurality of data output sections, each of the data output sections driving one of the data lines based on the gray-scale data held by the flip-flop of the first data latch, and wherein the second driver circuit includes a plurality of data output sections, each of the data output sections driving one of the data lines based on the gray-scale data held by the flip-flop of the second data latch.

9. The data driver as defined in claim 5, wherein a direction from a first side to a second side of the electro-optical device, in which the data lines extend, is the same as the first or second shift direction.

10. The data driver as defined in claim 1, wherein, when the scan lines extend along a long side of the electro-optical device and the data lines extend along a short side of the electro-optical device, the data driver is disposed along the short side.

11. The data driver as defined in claim 2, wherein, when the scan lines extend along a long side of the electro-optical device and the data lines extend along a short side of the electro-optical device, the data driver is disposed along the short side.

12. The data driver as defined in claim 3, wherein, when the scan lines extend along a long side of the electro-optical device and the data lines extend along a short side of the electro-optical device, the data driver is disposed along the short side.

13. The data driver as defined in claim 4, wherein, when the scan lines extend along a long side of the electro-optical device and the data lines extend along a short side of the electro-optical device, the data driver is disposed along the short side.

14. The data driver as defined in claim 5, wherein, when the scan lines extend along a long side of the electro-optical device and the data lines extend along a short side of the electro-optical device, the data driver is disposed along the short side.

15. The data driver as defined in claim 9, wherein, when the scan lines extend along a long side of the electro-optical device and the data lines extend along a short side of the electro-optical device, the data driver is disposed along the short side.

16. An electro-optical device comprising:

a plurality of scan lines;

a plurality of data lines;

a plurality of pixels;

the data driver as defined in claim 1 which drives the data lines; and a scan driver which scans the scan lines.

17. An electro-optical device comprising:

a display panel which includes a plurality of scan lines, a plurality of data lines the data driver as defined in claim 1 which drives the data lines; and a scan driver which scans the scan lines.

* * * * *